United States Patent
Havrilla

(10) Patent No.: US 12,188,538 B2
(45) Date of Patent: Jan. 7, 2025

(54) SHOCK ABSORBING CONTAINER AND VIBRATION ISOLATOR SYSTEM

(71) Applicant: Pelican Products, Inc., Torrance, CA (US)

(72) Inventor: George Havrilla, South Deerfield, MA (US)

(73) Assignee: Pelican Products, Inc., Torrance, CA (US)

( * ) Notice: Subject to any disclaimer, the term of this patent is extended or adjusted under 35 U.S.C. 154(b) by 573 days.

(21) Appl. No.: 16/741,592

(22) Filed: Jan. 13, 2020

(65) Prior Publication Data
US 2021/0215224 A1 Jul. 15, 2021

(51) Int. Cl.
*F16F 15/04* (2006.01)
*B65D 81/02* (2006.01)

(52) U.S. Cl.
CPC .............. *F16F 15/04* (2013.01); *B65D 81/02* (2013.01); *F16F 2230/105* (2013.01); *F16F 2234/08* (2013.01); *F16F 2236/045* (2013.01)

(58) Field of Classification Search
CPC .. F16F 15/04; F16F 2230/105; F16F 2234/08; F16F 2236/045; F16F 1/445; B65D 81/02; B65D 81/022; B65D 85/30
USPC ....................... 267/122, 118, 141.6; 206/521
See application file for complete search history.

(56) References Cited

U.S. PATENT DOCUMENTS

| | | | | |
|---|---|---|---|---|
| 1,387,288 A | * | 8/1921 | Menefee | F16F 1/445 5/255 |
| 2,670,914 A | * | 3/1954 | Jones | F16F 1/422 267/141.6 |
| 3,117,752 A | * | 1/1964 | Gillmore | B64D 1/14 267/118 |
| 3,137,466 A | * | 6/1964 | Rasmussen | F16F 13/08 248/631 |
| 3,667,707 A | * | 6/1972 | Mui | B60N 2/525 248/631 |
| 3,690,540 A | | 9/1972 | Hardigg | |

(Continued)

FOREIGN PATENT DOCUMENTS

CN 206265600 U 6/2017
CN 209241759 U 8/2019
(Continued)

OTHER PUBLICATIONS

Extended European Search Report dated Apr. 21, 2021, from application No. 20207131.2.
(Continued)

*Primary Examiner* — Xuan Lan Nguyen
(74) *Attorney, Agent, or Firm* — Nelson Mullins Riley & Scarborough LLP

(57) ABSTRACT

A container system including an outer shell, a deck disposed within the outer shell and configured to support cargo, and at least one vibration isolator member to support the deck within the outer shell and reduce or dampen a transfer of shock or vibration to the deck. Each vibration isolator member includes a hollow, flexible body configured to resiliently compress in response to a force. At least one fastener interface secures the flexible body to the bottom wall or to the deck. The hollow, flexible body has one or more apertures to allow fluid flow into and out of an inner cavity of the flexible body during compression or expansion.

17 Claims, 19 Drawing Sheets

(56) References Cited

U.S. PATENT DOCUMENTS

| | | | |
|---|---|---|---|
| 3,889,936 A | | 6/1975 | Shimizu |
| 4,509,730 A | * | 4/1985 | Shtarkman ............ F16F 13/002 |
| | | | 267/152 |
| 5,535,994 A | * | 7/1996 | Safreed, Jr. ............. F16F 9/057 |
| | | | 267/122 |
| 6,257,561 B1 | * | 7/2001 | Nakayama ................ B61F 5/08 |
| | | | 267/64.19 |
| 7,891,922 B2 | | 2/2011 | Fukuda |
| 9,939,041 B2 | * | 4/2018 | Kronkright ............ F16F 15/06 |
| 2013/0233760 A1 | * | 9/2013 | Polando ............ B65D 19/0028 |
| | | | 206/591 |

FOREIGN PATENT DOCUMENTS

| | | | | |
|---|---|---|---|---|
| DE | 17 72 785 U | | 8/1958 | |
| EP | 0 148 104 A2 | | 7/1985 | |
| JP | H02262438 A | | 10/1990 | |
| JP | 06129466 A | * | 5/1994 | ............ F16F 9/0409 |
| JP | 06159422 A | * | 6/1994 | ............ F16F 9/0409 |
| WO | WO-2013/036954 A1 | | 3/2013 | |
| WO | 2018/053395 | | 3/2018 | |

OTHER PUBLICATIONS

Australian Examination Report dated Jun. 9, 2021, from application No. 2020264317.

Canadian Examiner's Report dated Nov. 30, 2021, from application No. 3097871.

Australian Examination Report dated Mar. 27, 2022, from application No. 2020264317, 2 pages.

SKID-MATE & SKID-MATE + Plus Cushions Product Description, 1991 Hardigg Industries, Inc.

European Examination Report dated Jan. 26, 2023, for corresponding European Application No. 20207131.2.

1 Extended European Search Report dated Feb. 15, 2024 from European Application No. 23190005.1.

* cited by examiner

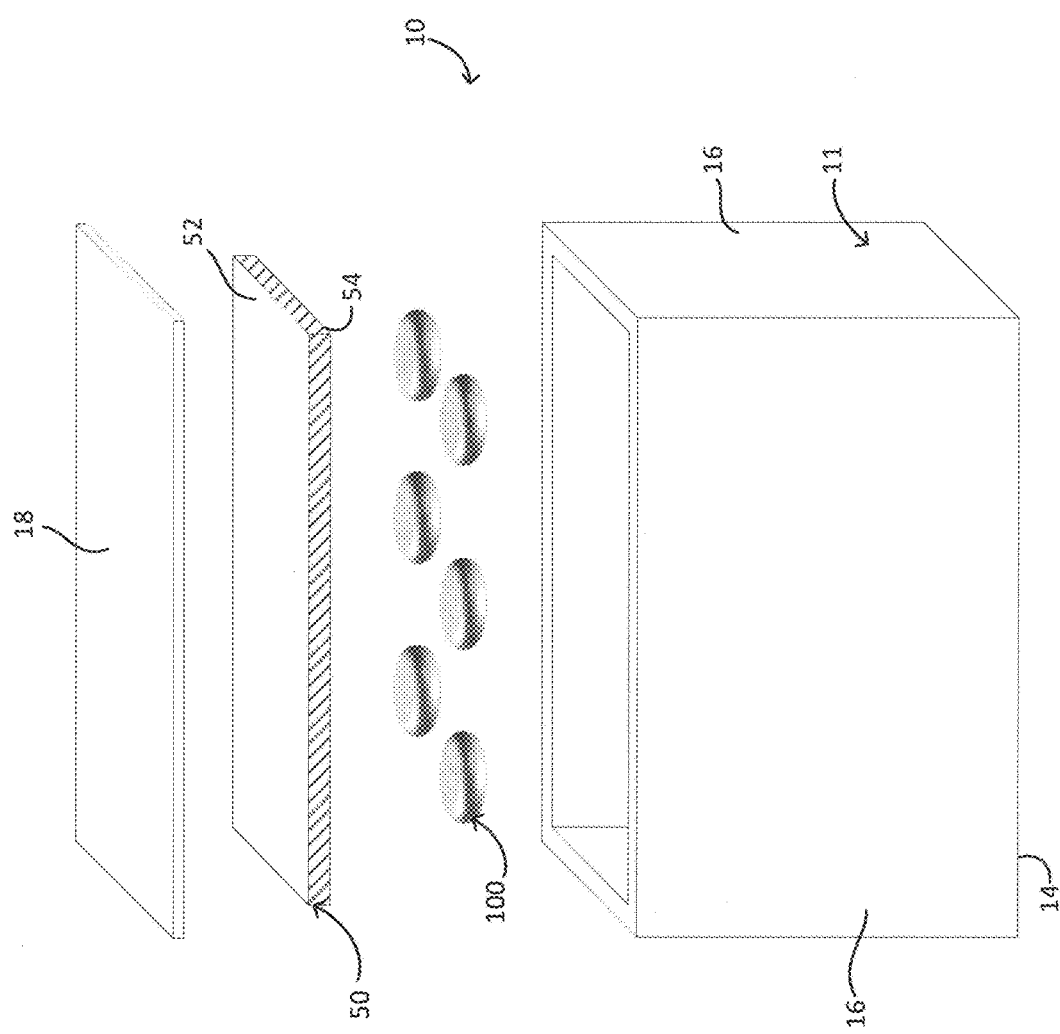

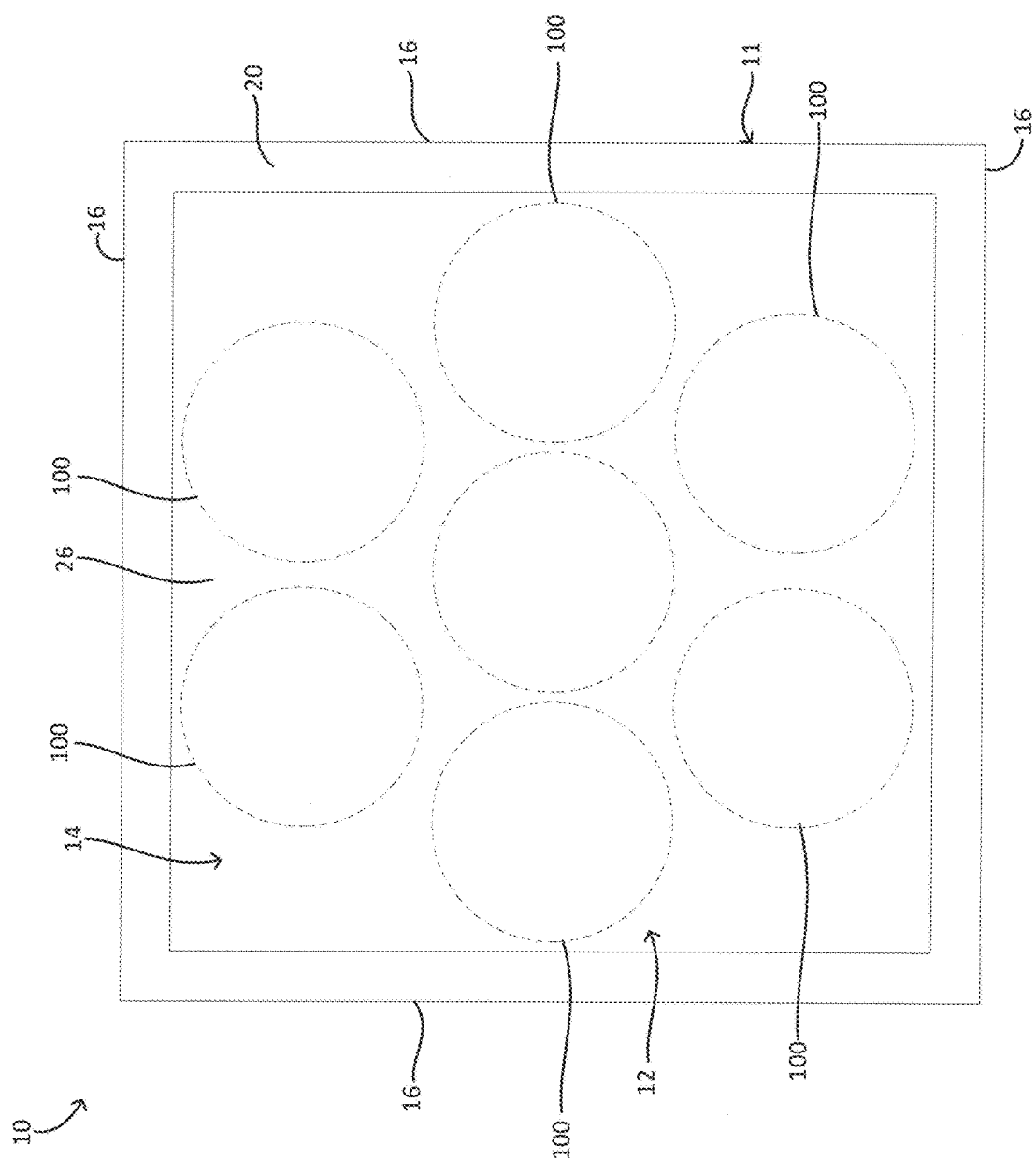

SHOCK ABSORBING CONTAINER AND VIBRATION ISOLATOR SYSTEM

BACKGROUND

The present disclosure relates generally to the field of containers including, but not limited to, shipping containers, storage containers, or containers used for other purposes. The present disclosure also relates to shock or vibration isolating systems for cargo. Specific examples relate to containers having shock or vibration isolating systems, configured to contain and protect cargo (one or more objects, items, goods, fragile or breakable articles, live cargo, biological cargo, or the like) within the container during transportation, storage or other activities.

Containers as described herein may be used in a variety of contexts, including, but not limited to transporting cargo (including any type of objects, items, goods, fragile or breakable articles, live cargo, biological cargo, tactical or explosive items, or the like) between locations (e.g., countries, cities, states, businesses, people, etc.), storing cargo, or holding or protecting cargo for other activities. Containers typically define an interior volume in which cargo can be held during transportation, storage or other activities. Different types and sizes of container structures may be used for different types of cargo, or for different contexts or applications of use. For example, certain containers for mass transportation of cargo may utilize inexpensive cardboard box structures to reduce costs, while certain containers for transportation of fragile or breakable cargo may utilize shock resistant structures contained in or configured on the containers.

Certain containers configured to reduce physical shock experienced by cargo may include one or more structures or features to dampen or otherwise reduce the transfer of physical shocks to cargo held within the container. In some examples, shock-dampening containers may include an outer shell structure, and a suspended deck or platform that hangs within an interior volume of the outer shell structure by a hanging suspension mechanism. The deck or platform may be configured to hold one or more articles or objects (cargo) within the interior volume of the outer shell. In some previous examples, a deck or platform has been suspended within a container shell, by hanging the deck or platform with multiple rubber bands or strap members, springs, or the like, that each have one end attached to the deck or platform and another end attached to the inner wall of the container shell. In such examples, the deck or platform may need to be made of a material or configuration that has a sufficient strength or rigidity (or both) to be suspended in a hanging manner by bands or straps (or springs). In addition, the bands, straps or springs can stretch or break over time or over multiple uses, reducing their ability to dampen shocks. Such bands, straps or springs may require replacement after a period of usage, and may include expiration dates or number-of-usage limits.

SUMMARY

Example embodiments described herein relate to containers and shipping containers configured to contain and protect cargo (one or more objects, items, goods, fragile or breakable articles, live cargo, biological cargo, or the like) within the container.

One embodiment relates to a container system having an outer shell defining an internal volume, where the outer shell has a bottom wall. A deck is disposed within the internal volume of the outer shell and is configured to support cargo. At least one vibration isolator member is disposed within the internal volume of the outer shell, to support the deck within the outer shell and reduce or dampen a transfer of shock or vibration to the deck. Each vibration isolator member includes a flexible body having an outer wall and an inner cavity, where the flexible body configured to resiliently compress in response to a force. Each vibration isolator also includes at least one fastener interface to secure the flexible body to the bottom wall or to the deck. The outer wall includes one or more apertures to allow fluid flow into and out of the inner cavity of the flexible body during compression or expansion of the flexible body.

In further embodiments of the container system, each vibration isolator member further includes at least one attachment interface configured to facilitate placement or mounting of the vibration isolator member in a position relative to at least one of the deck and the lower inner surface of the container.

In further embodiments of the container system, each vibration isolator member further includes a first hub configured to attach to the deck or a second hub configured to attach to the bottom wall of the outer shell.

In further embodiments of the container system, each vibration isolator member further includes at least one fastener opening for receiving at least one fastener in or around the first hub to fasten the vibration isolator member to the deck, or at least one fastener opening for receiving at least one fastener in or around the second hub to fasten the vibration isolator member to the bottom wall of the outer shell.

In further embodiments of the container system, each vibration isolator member further includes a first hub configured to attach to the deck and a second hub configured to attach to the bottom wall of the outer shell.

In further embodiments of the container system, the flexible body of each vibration isolator member includes a hollow body made of resilient plastic material that selectively compresses into a compressed state in response to the force applied to the vibration isolator member, and returns to a pre-compressed state when the force is removed.

In further embodiments of the container system, the hollow body is empty and free to flex and compress along a plurality of different axial directions.

In further embodiments of the container system, the hollow body has a round, disc shape defining an outer diameter D dimension and a height H dimension, and the hollow body is flexible to compress along a main axis of the round, disc shape, and along any axis of a plurality of further axes that are at an oblique angle relative to the main axis, in response to receiving a force along one of the main or further axis.

In further embodiments of the container system, the bottom wall includes at least one interface region, each interface region having a mounting surface on which a vibration isolator member is mounted, each mounting surface having an annular or partially annular shape that extends around or partially around an opening or recess, the opening or recess for receiving a hub of a vibration isolator member.

In further embodiments of the container system, the bottom wall includes at least one interface region, where each interface region has a protrusion portion that protrudes above a surface of the bottom wall and has an upper mounting surface for supporting one of the vibration isolator members, and an opening or recess for receiving a hub of a vibration isolator member.

In further embodiments of the container system, the protrusion of each interface region forms a reverse shaped depression on an outer surface of the bottom wall, for receiving at least one protruding feature on another container, when the outer shell is stacked onto that other container.

In further embodiments of the container system, the at least one vibration isolator member includes a plurality of vibration isolator members disposed within the internal volume of the outer shell, to support the deck within the outer shell and reduce or dampen a transfer of shock or vibration to the deck.

Further embodiments relate to a shock or vibration isolator system that includes at least one deck for holding cargo; and at least one vibration isolator member coupled to the deck, for supporting the deck and to reduce or dampen a transfer of shock or vibration to the deck, where each vibration isolator member includes a flexible body having an outer wall and an inner cavity, the flexible body configured to resiliently compress in response to a force; and at least one fastener interface to secure the flexible body to the deck, where the outer wall includes one or more apertures to allow fluid flow into and out of the inner cavity of the flexible body during compression or expansion of the flexible body.

In further embodiments of that system, each vibration isolator member further includes at least one attachment interface configured to facilitate placement or mounting of the vibration isolator member in a position relative to the deck.

In further embodiments of the shock or vibration isolator system, each vibration isolator member further includes a first hub configured to attach to the deck.

In further embodiments of the shock or vibration isolator system, each vibration isolator member further includes at least one fastener opening for receiving at least one fastener in or around the first hub to fasten the vibration isolator member to the deck.

In further embodiments of the shock or vibration isolator system, wherein each vibration isolator member further comprises a first hub configured to attach to the deck and a second hub configured to attach to a bottom wall of a container shell.

In further embodiments of the shock or vibration isolator system, the flexible body of each vibration isolator member includes a hollow body made of resilient plastic material that selectively compresses into a compressed state in response to the force applied to the vibration isolator member, and returns to a pre-compressed state when the force is removed.

In further embodiments of the shock or vibration isolator system, the hollow body is empty and free to flex and compress along a plurality of different axial directions.

In further embodiments of the shock or vibration isolator system, the hollow body has a round, disc shape defining an outer diameter D dimension and a height H dimension, where the hollow body is flexible to compress along a main axis of the round, disc shape, and along any axis of a plurality of further axes that are at an oblique angle relative to the main axis, in response to receiving a force along one of the main or further axis.

In further embodiments of the shock or vibration isolator system, the at least one vibration isolator member includes a plurality of vibration isolator members coupled to the deck to support the deck and reduce or dampen a transfer of shock or vibration to the deck.

In further embodiments of the shock or vibration isolator system, each vibration isolator member includes an extending hub and wherein the deck includes at least one aperture for receiving at least a portion of the extending hub of each vibration isolator member.

BRIEF DESCRIPTION OF THE DRAWINGS

The above and other aspects and features of the present invention will become more apparent to those skilled in the art from the following detailed description of the example embodiments with reference to the accompanying drawings, in which:

FIG. 2 is an exploded view of the container assembly of FIG. 1.

FIG. 20 is a schematic diagram of a sixth arrangement of a plurality of deforming members according to one embodiment.

DETAILED DESCRIPTION

Container/Isolator System

Figure 1:
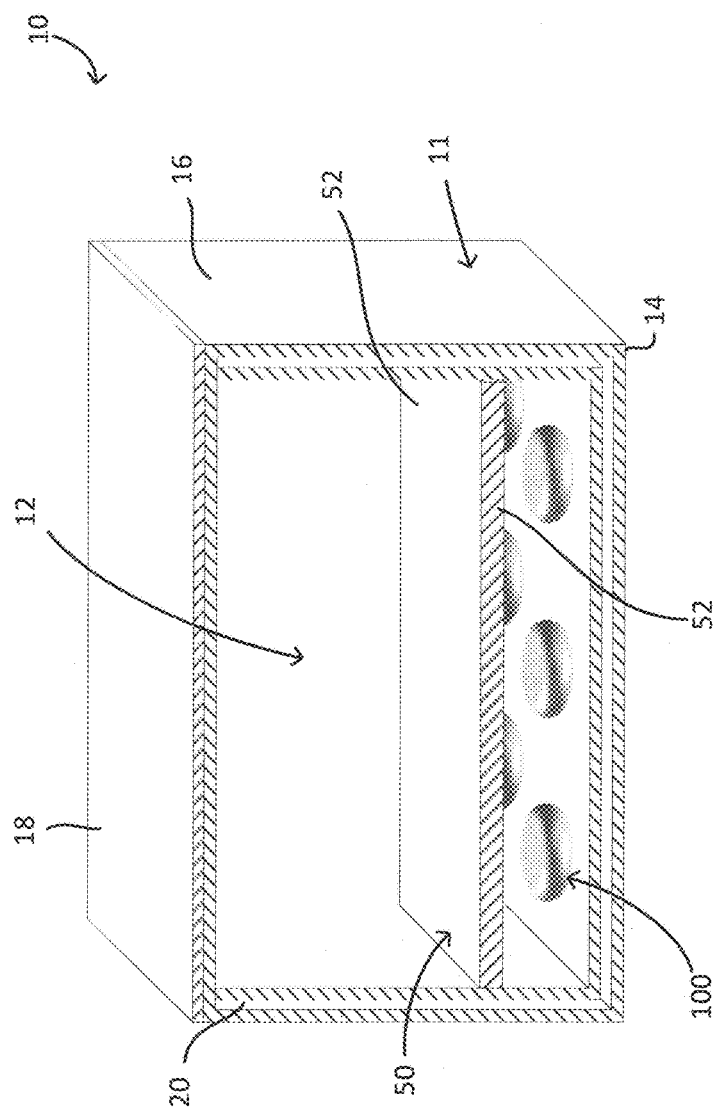
FIG. 1 is cross-sectional, perspective view of a container assembly, according to an exemplary embodiment.

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

Embodiments described herein relate to shock and vibration isolating systems that may be used in various contexts. Certain embodiments relate to container systems and containers including, but not limited to, shipping containers, storage containers, or other purpose containers having shock and vibration isolating systems. Specific examples relate to container systems and containers configured to contain and protect cargo (one or more objects, items, goods, fragile or breakable articles, live cargo, biological cargo, tactical or explosive items, or the like) during transportation, storage or other activities. Containers according to example embodiments described herein may be used for specific contexts and applications of use (for containing, transporting, storing or the like, of specific cargo or specific types of cargo), while containers according to further example embodiments described herein may be used for more general contexts and applications of use (for multiple types of cargo). Containers according to some examples are configured to hold cargo, to protect cargo from damage, to form a barrier between hazardous material and cargo, or any combination thereof. However, in other examples, shock and vibration isolating systems as described herein may be included in other devices or systems such as, but not limited to pallets, cargo areas in trucks, planes, ships, or warehouses, or the like.

Container systems according to example embodiments may include one or more containers (or one or more containers and container components) as described herein. In some examples, container systems may include additional components for assisting with transporting, storing, arranging, or other actions involving containers as described herein.

In certain examples, containers as described herein include or are configured with a shock or vibration isolator system having one or more structures or features to reduce or dampen physical shocks experienced by the cargo. In some examples, a container may include an outer shell structure, and a suspended deck or platform that is held within an interior volume of the outer shell structure by a suspension mechanism. The deck or platform may be configured to hold one or more articles or objects (cargo) within the interior volume of the outer shell. Further example embodiments relate to shock or vibration isolator systems as described herein, but configured to support a deck or platform outside of (or without) an outer shell of a container (for example, but not limited to, on a bed or cargo area or deck of a truck, ship or plane, or on a floor or shelf of a warehouse, or the like). Further example embodiments relate to components of shock or vibration isolator systems as described herein, including, but not limited to vibration isolator members as described herein.

In certain examples, the suspension mechanism may include one or more resilient or flexible vibration isolator members. In certain examples, the one or more (or plurality) of resilient or flexible vibration isolator members are provided beneath the deck or platform, to suspend or hold the deck or platform above the bottom wall of the outer shell. Each resilient or flexible vibration isolator member is configured to flex or deform when a physical shock force or vibration is applied to the container (to the outer shell of the container), to dampen or reduce the force of the shock or vibration transferred to the deck or platform suspended within the outer shell of the container.

In some examples, a container may also include one or more layers or pads of shock dampening or cushioning material or packing material, such as, but not limited to foam, fabric, bubble-wrap material, springs, pillows or the like) to reduce the transfer of physical forces from the outer shell of the container to cargo on the platform within the outer shell of the container, or to reduce motion of the suspended platform or cargo relative to the outer shell. In this regard, shocks, bumps, accelerations, decelerations and other physical forces imparted on the outer shell of the container (for example, during transportation or handling of the container), can be dampened with respect to the suspended platform and cargo held by the suspended platform.

Referring to FIGS. 1-20, an example container system, or container 10 (hereinafter referred to as container 10) includes an outer shell 11 that defines an interior volume 12. The container 10 also includes a deck or platform 50 and one or more (or a plurality of) flexible vibration isolator members 100 within the interior volume 12. The deck or platform 50 is configured to hold cargo (one or more objects, items, goods, fragile or breakable articles, live cargo, biological cargo, or the like) during transportation, storage or other activities of the container 10. In certain examples, the container 10 is configured to hold or protect (or both) the cargo (not shown), when the cargo is held within the interior volume 12 of the container 10. In some examples, the container 10 is part of a system of multiple containers (including other containers 10, other similar containers or other different containers) that can be used together, or stacked or arranged together (e.g., in rows or columns, etc.), such as in a modular arrangement.

Container Shell

The outer shell 11 of the container 10 may include a bottom wall 14 and one or multiple side walls 16 (for example, front, back, left and right side walls) that are connected together, or are formed integrally, to define an interior volume (e.g., volume 12) bordered by the side walls 16 and bottom wall 14. In the illustrated examples, the side walls 16 extend upward from a perimeter of the bottom wall 14, to surround and form the open interior volume 12 of the container 10.

In certain examples, the container 10 is configured to contain and protect cargo (not shown), when the cargo is held within the interior volume 12 of the container 10. The outer shell 11 (including the bottom wall 14 and side wall(s) 16) of the container 10 may be formed of a suitably rigid material that holds its shape and resists impacts up to a definable magnitude of force. For example, the outer shell 11 (including the bottom wall 14 and side wall(s) 16) may be made of one or more (or any combination) of plastic or other polymer, metal, wood, composite material, or the like. The outer shell 11 (including the bottom wall 14 and side wall(s) 16) may be made by any suitable manufacturing method or methods including, but not limited to injection molding, rotational molding (roto-molding), blow molding, other molding methods, cutting or other machining, or the like. In particular examples, the outer shell 11 is made of a high strength resin polymer material that can be readily molded into a desired shape.

The outer shell 11 in the examples shown in the drawings has a generally rectangular, cube shape. However, in other examples, the outer shell 11 may have any other suitable shape or configuration including, but not limited to other square or other polygonal cube or cuboid shapes, rounded or spheroid or semi-spheroid shapes, or the like. In some examples, the bottom wall 14 and/or side walls 16 can be irregular shapes (e.g., a shape including both curved and straight walls, etc.). In some examples, the shape of the outer shell 11 is configured to correspond to the shape of one or more objects to be held within the container 10. In some examples, the shape of the outer shell 11 is configured for enhancing the ability of the container 10 to be stacked or arranged together (e.g., in rows or columns, etc.) with other containers 10, such as in a modular arrangement.

In some examples, the outer shell 11 may include a lid or top wall 18 located opposite the bottom wall 14 and coupled to the side wall(s) 16. In some examples, the lid or top wall 18 is selectively moveable or removable (relative to the side walls 16) to selectively open or close the interior volume 12 of the container shell 11. The lid or top wall 18 may have a shape and configuration suitable for covering, partially covering, or sealing the open end of the container 10, opposite the bottom wall 14 end of the container 10. In certain examples, the lid or top wall 18 may be made of the same or similar material and methods as described above with regard to the bottom wall 14 and side wall(s) 16 of the outer shell 11.

In some embodiments, the container 10 includes one or more hinges coupled to one of the side walls 16 and the lid or top wall 18. The hinges are configured to facilitate selective pivoting of the lid or top wall 18 relative to the side walls 16 between a closed configuration and an open configuration. The closed configuration being when the lid or top wall 18 is in a closed state to isolate or partially isolate the interior volume 12 from the ambient environment outside of the shell 11. The open configuration being when the lid or top wall 18 is in an open state such that the interior volume 12 is open to the ambient environment. In other embodiments, the lid or top wall 18 is coupled to the side walls 16 via fasteners (e.g., screws, nails, rivets, etc.) or adhesive (e.g., glue, tape, etc.). In certain examples, the outer shell 11 and (or) the side walls 16 may include one or more latches or locks to selectively latch or lock the lid or top wall 18 to the side walls 16 and secure the lid or top wall 18 to the side walls 16, and to selectively unlatch or lock the lid or top wall 18 from the side walls 16 and allow the lid or top wall 18 to be pivoted, moved or removed to open the container shell 11 and allow access to the interior volume 12.

In some embodiments, one or more (or all) of the bottom wall 14, the top wall 18, the side wall(s) 16 or the lid 18 have multiple wall panels (in a double-walled or other multiple-walled configuration) having an outer wall panel, an inner wall panel and a cavity 20 between the outer and inner wall panels. In some examples, the cavity 20 may be empty or sealed and evacuated (vacuum), for thermal insulation. In some examples, a thermal insulating material or a cushioning material (such as, but not limited to, foam, plastic, polystyrene, cellulose, mineral wool, fiberglass, natural fibers, etc.) is located in the cavity 20 to provide further thermal insulation or to provide further cushioning for the cargo stored within the container 10. In some embodiments, one or more (or all) of the bottom wall 14, the top wall 18, the side wall(s) 16 or the lid 18 have one or more openings, valves or other structure that allows passage of air or equalization or adjustment of pressure between the interior volume 12 of the container 10 and the exterior environment of the container 10, when the lid 18 is in a closed state.

In particular examples, the container 10 includes one or more (or a plurality of) interface regions 22 located on, or formed on the bottom wall 14. Examples of interface regions 22 on a bottom wall 14 are described with reference to FIGS. 3, 4, 5, 6 and 7. In some examples, the interface regions 22 are molded portions of the bottom wall 14, formed during a process of molding the bottom wall 14 or the container shell 11. Alternatively, the interface regions may be formed or partially formed by stamping, machining or other manufacturing processes. In other examples, the interface region(s) 22 may be formed on a panel or other structure (not shown) placed on the bottom wall 14 or otherwise held within the container shell 11.

Each interface region 22 is configured to couple to a respective flexible vibration isolator member 100. The interface regions 22 may have any suitable configuration or shape and, in particular examples, are configured to hold and retain the flexible vibration isolator members 100 in a fixed position, while allowing the flexible vibration isolator members 100 to flex and compress along multiple directions (along multiple axes).

Figure 4:
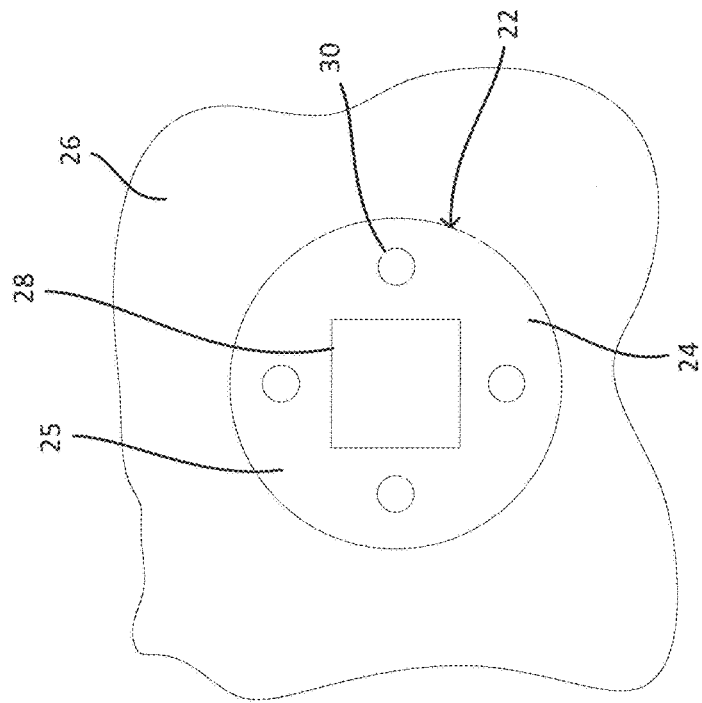
FIG. 4 is a top-down view of an interface region, according to another exemplary embodiment.
Figure 3:
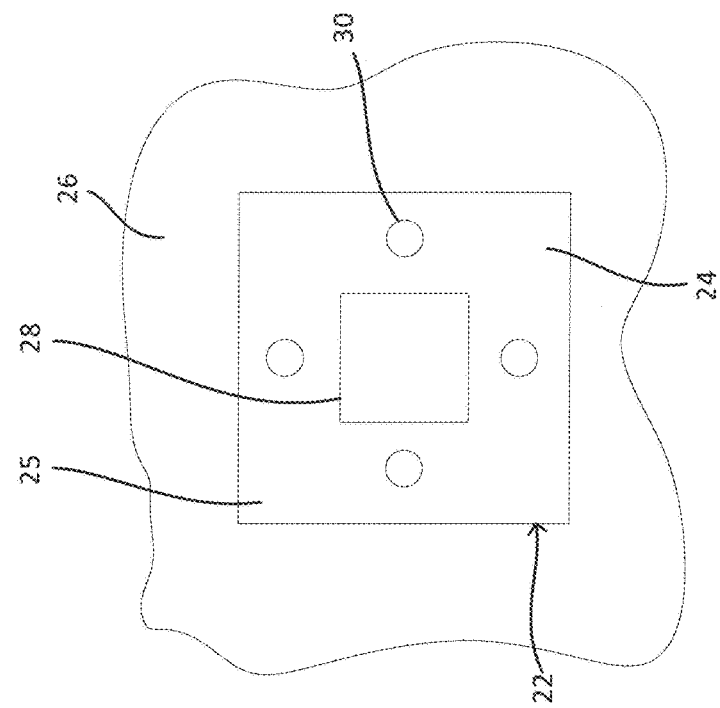
FIG. 3 is a top-down view of an interface region, according to an exemplary embodiment.
Figure 5:
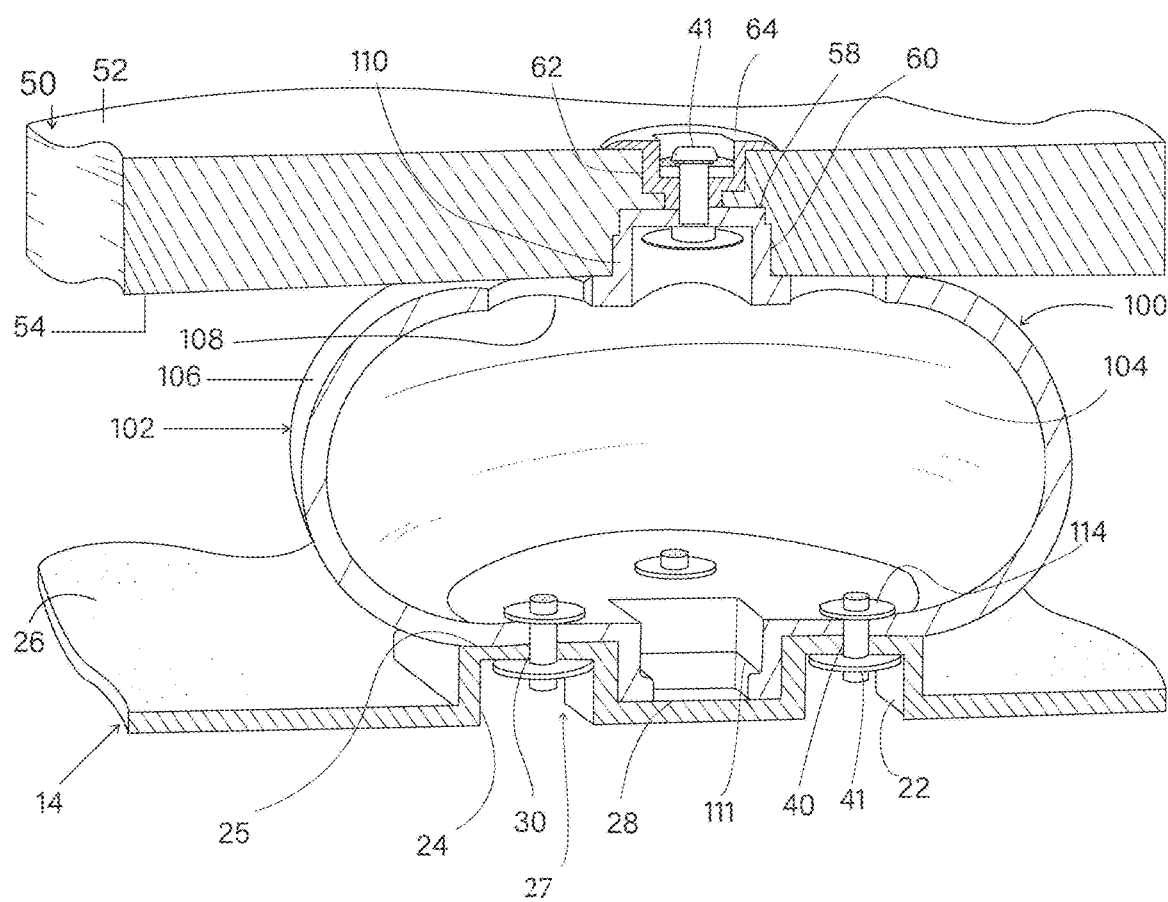
FIG. 5 is a partial section view of a portion of the container assembly of FIG. 1 having an example of an interface region.
Figure 6:
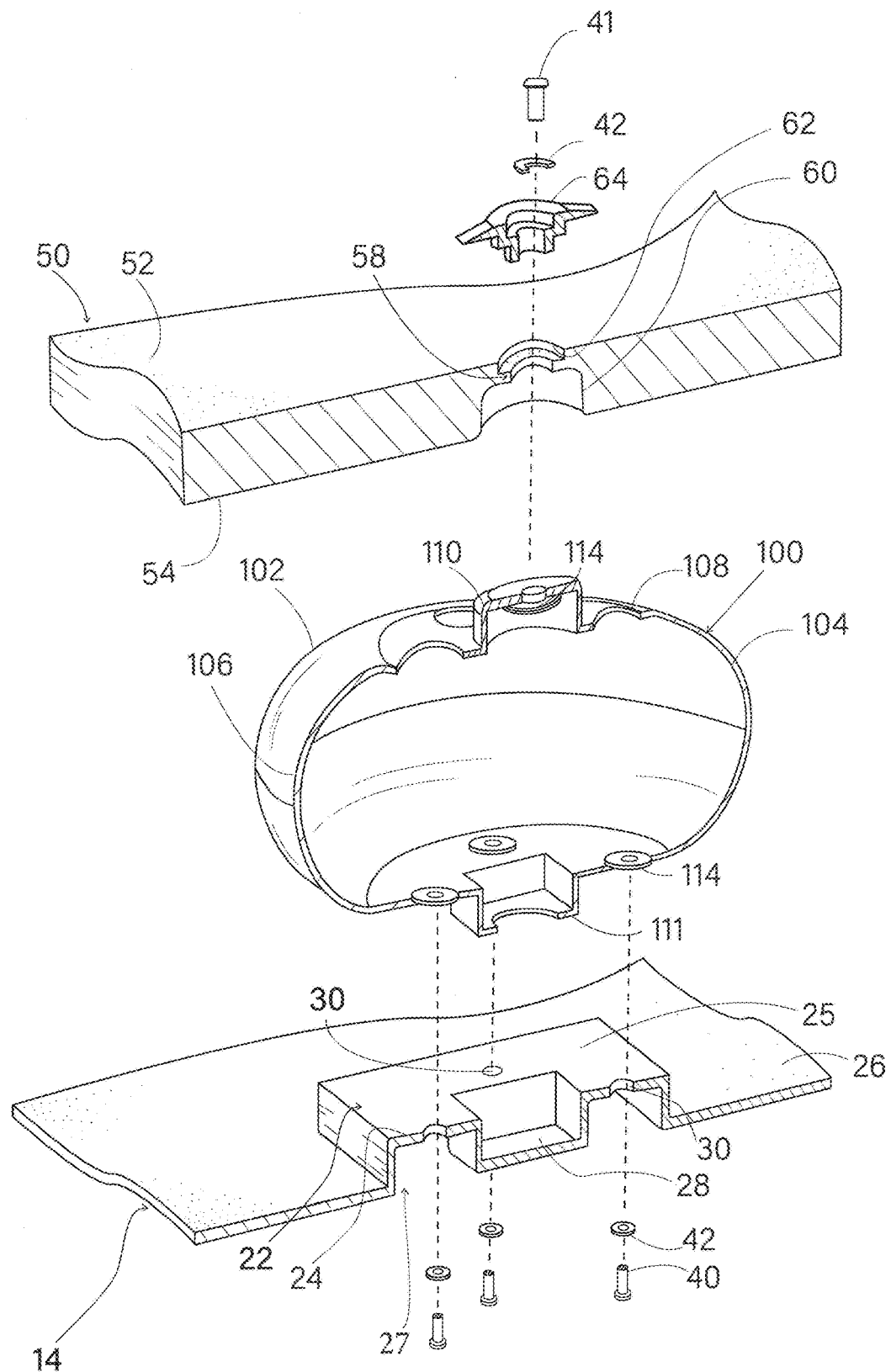
FIG. 6 is an exploded view of the partial section view of FIG. 5.
Figure 7:
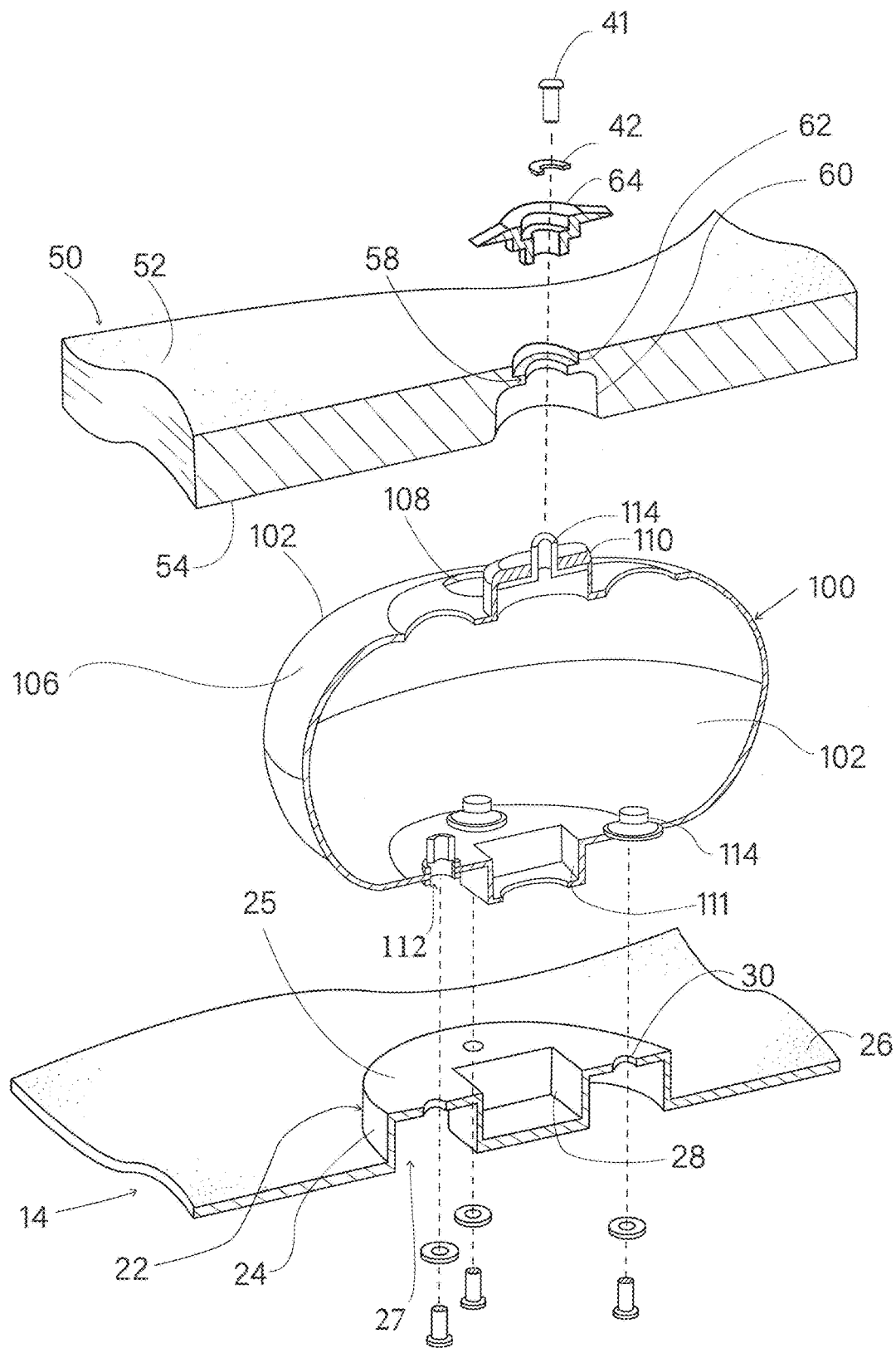
FIG. 7 is a partial section exploded view of a portion of the container assembly of FIG. 1 having another example of an interface region.

FIGS. 3 and 4 show top-down views of two respective examples of an interface region 22 (located on the upward-facing surface of the bottom wall 14). FIGS. 5 and 6 show a cut-away, section view and an exploded cut-away, section view of the example interface region 22 of FIG. 3, with a vibration isolator member 100 and a deck 50 secured thereto. FIG. 7 shows an exploded cut-away, section view of the example interface region 22 of FIG. 4, with a vibration isolator member 100 and a deck 50 secured thereto. In particular examples, the bottom wall 14 may include a single interface region 22. In other examples, the bottom wall 14 includes a plurality of interface regions 22 arranged in a pattern including, but not limited to a pattern as described herein with regard to FIGS. 16-20.

In particular examples, the bottom wall 14 is provided with one or more (or a pattern) of interface regions 22 at pre-defined locations, for mounting one or more vibration isolator members 100 to the bottom wall 14 at the one or more (or pattern) of locations. In particular examples, the one or more (or pattern) of locations is configured for providing a desired or maximum support capability, vibration isolation and stability (when supporting a deck or platform 50). In some examples, the bottom wall 14 of the outer shell 11 is provided with a plurality of interface regions 22 arranged in multiple selectable patterns or multiple selectable locations, to allow one or more vibration isolator members 100 to be mounted to the bottom wall 14 at one or more selectable patterns or locations, such that the same outer shell 11 may be configured for any one of multiple different cargo or decks, or for selecting a desired container support capability, vibration isolation or stability for a given cargo or deck.

In certain examples, each interface region 22 includes a protrusion 24 extending upward from other portions of an inside surface 26 of the bottom wall 14. As described herein, each protrusion 24 provides a mounting surface 25 on which a respective vibration isolator member 100 may be mounted. In some embodiments, the protrusion 24 (and mounting surface 25) has a defined peripheral shape (e.g., a circle, a square, a triangle, etc.). In the example in FIGS. 3, 5 and 6, the protrusion 24 (and mounting surface 25) has a square shape. In the example in FIGS. 4 and 7, the protrusion 24 (and mounting surface 25) has a round shape. In certain embodiments, the protrusion 24 (or mounting surface 25) has a non-symmetrical or irregular peripheral shape (e.g., a circle with a notch, a square with a rounded side, etc.).

In some examples, the mounting surface 25 is provided along (or defines) a horizontal plane that is substantially parallel with the horizontal major plane (the rest of the upward-facing surface) of the bottom wall 14. In other examples, the mounting surface 25 of one or more (or each) of the interface regions 22 are provided in (or define) a plane that is at an oblique angle relative to the major plane of the bottom wall 14. The angle of the mounting surface 25 can determine the angle of a major axis $A_1$ of the vibration isolator member 100, when supported on the mounting surface. In certain examples, the protrusion 24 (or mounting surface 25) may have a shape or configuration that provides one or more functions or operations, including: (a) supporting or retaining a flexible vibration isolator member 100 while allowing the flexible vibration isolator member 100 to flex and compress along multiple axes; (b) holding or directing the flexible vibration isolator member 100 in a predetermined orientation relative to the bottom wall 14; (c) forming a recess or contour on the outer bottom surface of the bottom wall 14 to facilitate stacking or arranging the container 10 with other containers or structures; (d) facilitating manufacturing or assembly of the container 10; or (e) any combination thereof.

The interface region 22 can include an opening or a recess 28 within the protrusion 24. The opening or recess 28 can have the same peripheral shape or a different peripheral shape than the protrusion 24. The opening or recess 28 forms a receptacle for receiving a downward extending hub of a vibration isolator member 100, as described herein. In some examples, the opening or recess 28 is provided in a central portion of the protrusion 24 (or of the mounting surface 25), such that the mounting surface 25 defines a full or partial annular or ring shape that surrounds (or partially surrounds) the opening or recess 28. The annular or partially annular mounting surface 25 can provide mounting support and multiple locations for fasteners around (or partially around) the opening or recess 28. In particular examples, the vibration isolator member 100 is mounted onto the mounting surface 25 such that orientation of the main axis $A_1$ of the isolator member 100 is defined, at least in part, by the orientation of the plane of the mounting surface 25. In particular examples, the mounting surface 25 has a size and peripheral shape that is smaller than the size and peripheral shape of the vibration isolator member 100 (at its maximum width or diameter), to avoid or reduce interference with the ability of the vibration isolator member 100 to flex and compress along multiple directions (or axes).

In particular examples, the protrusion 24 of each interface region 22 forms a recess or contour (e.g., having a reverse shape of the protrusion 24) on the outer, bottom surface of the bottom wall 14. In certain examples, a plurality of interface regions 22 forms a plurality or pattern of recesses or contours 27 that facilitate stacking or arranging the container 10 with other containers or structure. In such examples, the container lid 18 of a first container 10 may include one or more (or a plurality of) protrusions that fit within the recesses or contour on the bottom surface 26 of a second container (similar to the container 10), when the second container is stacked on top of the first container. Similarly, the first container 10 may be stacked on top of yet another container having a similar lid configuration. When stacked, the recesses or contours of the container 10 receive protrusions on the lid of another container, to help retainer the containers in a stacked orientation, without moving or slipping laterally relative to each other.

In certain examples, the interface region 22 includes one or more fastener apertures 30 (e.g., holes, slots, openings, etc.) on the mounting surface 25 or other portion of the protrusion 24, or in the recess 28. In the example in FIGS. 3, 4, 5, 6 and 7 each protrusion 24 includes four fastener apertures 30 (where three are shown in the cross-section view of FIGS. 5, 6 and 7), at spaced locations around the perimeter of the recess 28. In other examples, the protrusion 24 may include more or fewer than four fastener apertures 30 (for associated fasteners), spaced around the perimeter of the recess 28. Each fastener aperture 30 is configured to receive a fastener 40 (such as, but not limited to a bolt, a screw, a bracket, a clip, or the like) configured to fixedly couple the flexible vibration isolator member 100 to the mounting surface 25 (and, thus, to the bottom wall 14 of the outer shell 11).

In some examples, each fastener 40 includes a head and a threaded shaft, and is associated with one or more spacers 42 (such as, but not limited to one or more washers). In such examples, the threaded shaft of the fastener 40 may be configured to extend through a fastener aperture and make threaded engagement with a threaded aperture or threaded nut in or on a vibration isolator member 100, while the head of the fastener 40 and the one or more spacers 42 are located on the exterior surface side of the bottom wall 14. In some examples, the recess or contour 27 on the outer surface side of the bottom wall 14 has a width that is larger than a diameters of the head of the fastener 40 and the spacer 42, such that the head of the fastener 40 and the spacer 42 are received within the recess, when the threaded shaft of the fastener 40 is threaded into the threaded aperture or nut of the vibration isolator member 100. In certain examples, the recess 27 has an annular shape, corresponding to an annular shape of the mounting surface 25. In other examples, other suitable fasteners and fastening configurations may be employed for securing a vibration isolator member at one or more (or multiple) locations around an annular mounting surface 25 of a protrusion 24. In yet other examples, other suitable fasteners and fastening configurations may be employed, for securing a vibration isolator member 100 to an interface region 22 on the bottom wall 14 of the outer shell 11, without protrusions 24.

Deck

In particular examples, the container 10 (or the vibration isolator system) includes a deck or platform 50 (hereinafter referred to as the deck 50) such as, but not limited to a panel, rack, shelf, box, basket, or other support structure capable of supporting cargo. In certain examples, the deck 50 is located or configured to be located within the interior volume 12 of the outer shell 11 of the container 10. In other examples, a vibration isolator system includes a deck 50, outside of (or without) an outer shell 11. The deck 50 has a surface or region 52 (such as, but not limited to, an upper surface) for receiving and supporting cargo. The deck 50 has a surface 54 (such as, but not limited to, a lower surface) that faces opposite to the cargo-supporting surface or region 52.

In some examples, the cargo-supporting surface or region 52 includes a generally flat surface on which cargo may be placed. In other examples, the surface or region 52 has a feature, contour or shape for retaining a specific type of cargo (including, but not limited to one or more recessed regions, retaining walls, or shaped or rounded contours for retaining correspondingly shaped, rounded or spherical cargo, etc.). In further examples, the surface or region 52 of the deck 50 may include or operate with one or more cargo retaining mechanisms for holding cargo onto the surface or region 52, such as, but not limited to one or more brackets, clips, straps, bands, magnets, Velcro, adhesive, or the like.

In some examples, the deck 50 may have an outer perimeter size or shape that is similar to or corresponds to an inner perimeter size and shape of the side wall(s) 16 of the outer shell 11 of the container 10, to maximize the cargo-retaining area of the surface or region 52 of the deck. In other examples, the deck 50 may have an outer perimeter size or shape that is smaller than the inner perimeter size and shape of the side wall(s) 16 of the container 10, to provide a gap between the outer perimeter of the deck 50 and the inner surface of the side wall(s) 16, to allow or enhance lateral movement of the deck 50 relative to the inner surface of the side wall(s) 16. In particular examples, the deck 50 may have an outer perimeter size that provides a gap of several millimeters, centimeters, or a percentage of a width of the deck 50 (e.g., 1-20 mm, 0.5-5% of the width, or more, etc.) between the outer perimeter of the deck 50 and the inner surface of the side wall(s) 16.

In some examples, the deck 50 includes a panel or other support structure having a suitable structural strength to hold and support cargo (cargo intended to be held within the container 10). The deck 50 may be made of any suitable material or combination of materials including, but not limited to plastic, metal, wood, composite material, or the like. The deck 50 may have any suitable structural configuration including, but not limited to a solid panel or solid wall structures, for example, for high strength, durability, uniform load bearing capabilities or other functions or advantages. The deck 50 may have other configurations (including, but not limited to open framework configurations, cavities, honeycomb structure, mesh structure, or the like), for example, for strength, durability, weight reduction, or other functions or advantages.

In some examples, the deck 50 can include one or more walls (not shown) extending upward from the surface 52, to help secure cargo to the deck 50 or minimize movement of the cargo relative to the deck 50. In certain examples, the walls or the deck 50 (or both) include one or more cargo retaining features (e.g., protrusions, recesses, brackets, clips, straps, bands, magnets, Velcro, adhesive, or the like), configured to retain or couple to one or more corresponding feature on the cargo, to secure the cargo to the deck 50.

In particular examples, the deck 50 includes one or more (or a plurality of) interface apertures 58 (e.g., openings, holes, slots, etc.), each for receiving an upward extending hub of a vibration isolator member 100, or a fastener 41 (or both), as described herein. In particular examples, the deck 50 is provided with one or more (or a pattern) of interface apertures 58 at pre-defined locations of the deck 50, for mounting one or more vibration isolator members 100 to the deck 50 at one or more (or pattern) of locations of the deck 50. In particular examples, the one or more (or pattern) of locations is configured for providing a desired or maximum support capability and stability for the deck 50 (and cargo supported on the deck 50). In some examples, the deck 50 is provided with a plurality of interface apertures 58 arranged in multiple selectable patterns or multiple selectable locations, to allow one or more vibration isolator members 100 to be mounted to the deck 50 at one or more selectable patterns or locations, such that the same deck 50 may be configured for any one of multiple different cargo or for a selected or desired support capability, vibration isolation or stability. In some examples, each interface apertures 58 also receives a spacer 64. In certain examples, each interface aperture 58 extends through the deck 50, and may include an opening on the upper surface 52 and an opening on the lower surface 54 of the deck 50.

The fastener 41 may be similar to the fastener 40 discussed herein, or may be a different, suitable fastener. In certain examples, each fastener 41 includes a head and a threaded shaft, where the threaded shaft is configured to extend through an interface aperture 58 (or through a spacer 64 and an interface aperture 58) and make threaded engagement with a threaded aperture or nut in or on a vibration isolator member 100, while the head of the fastener 41 (and a head portion of the spacer 64) is located on the surface 52 side of the deck 50.

In certain examples, each interface aperture 58 includes a first region 60, extending upward (e.g., towards the upper surface 52) from the lower surface 54. The first region 60 can be configured to receive an upward extending hub of the vibration isolator member 100. Each interface aperture 58 further include a second region 62 extending downward (e.g., towards the lower surface 54) from the upper surface 52 of the deck 50. The second region 62 can be configured to receive the shaft portion of the fastener 41 (or the shaft portion of the fastener and a portion of the spacer 64). The spacer 64 is configured to reduce stresses and forces exerted on deck 50 by the fastener 41. The spacer 64 may be made of any suitable high strength plastic, metal, composite material, or the like. In certain examples that include spacers 64, the selection of materials and configurations for forming the deck 50 can be increased, as the spacers 64 may protect the deck 50 from damage.

Vibration Isolator Member

Referring to FIGS. 1-20, the container 10 (or the vibration isolator system) can include one or more (or a plurality of) flexible vibration isolator members 100. The flexible vibration isolator member(s) 100 may be positioned within the interior volume 12 of the container 10 and may be coupled to the deck 50 or to the outer shell 11 of the container 10 (or both). In particular examples, the flexible vibration isolator member(s) 100 are positioned below the deck 50 (and below cargo held on the deck 50), to support and hold up the deck 50 (and cargo) from below. However, in various examples, the flexible vibration isolator member(s) 100 may be arranged in other locations within the outer shell 11 of the container 10, for example, above, next to, or surrounding the deck 50 and cargo. In yet other examples, a vibration isolator system includes one or more (or a plurality) of the flexible vibration isolator member(s) 100 arranged to support a deck 50 (or other structure) outside of (or without) an outer shell 11 of a container 10.

Each flexible vibration isolator member 100 is configured to deform (e.g., compress, expand) in response to pressure or force, to dampen the transmission of force to the deck 50 from the outer shell 11 of the container 10. In certain examples, the flexible vibration isolator members 100 are configured and arranged in the container 10, to act as a cushion or dampening structure, to reduce the transmission to the deck 50 (and cargo supported by the deck 50) of vibrations, impact forces or other physical shocks received by the outer shell 11 of the container 10 (e.g., due to the container 10 being dropped, bumped, hit, vibrated, shifted, etc.).

Each flexible vibration isolator member 100 includes a hollow body 102 made of a resilient, flexible material and configuration. The hollow body 102 may be made of any suitable material that has sufficient strength, durability, resilience, and flexibility, such as, but not limited to polyethylene, polypropylene, or other suitable plastic or polymer material. In particular examples, the hollow body 102 is made of a material that is sufficiently flexible to compress when a sufficient compression force is applied to the hollow body 102, and has sufficient resilience to automatically return to its pre-compressed state after a compression force has been removed (self-returning). In particular examples, the hollow body 102 has one or more openings for venting air out of an interior cavity 104 of the hollow body 102 as the hollow body 102 is being compressed, and for venting air into the interior cavity 104 as the hollow body 102 decompresses and returns to a pre-compressed state. In some examples, the vent openings may include openings 108 and 112 or one or more other openings (not shown) through a wall 106 of the hollow body 102.

The hollow body 102 may be made by any suitable manufacturing method including, but not limited to a blow molding method. In other examples, the hollow body 102 may be made with other suitable molding methods, such as, but not limited to injection molding, rotational molding (roto-molding), or other molding methods, or by machining, extrusion, or the like. In certain examples, the hollow body 102 can be made in various colors. In some examples, the color of the hollow body 102 may be selected to represent, or based on a characteristic of the hollow body 102, such as, but not limited to, a relative stiffness or flexibility of the hollow body 102, a durability or strength of the hollow body 102, a supportable weight of the hollow body 102, a use period or date of the hollow body 102, a type of container or context of use of the hollow body 102, or a combination thereof.

Figure 8:
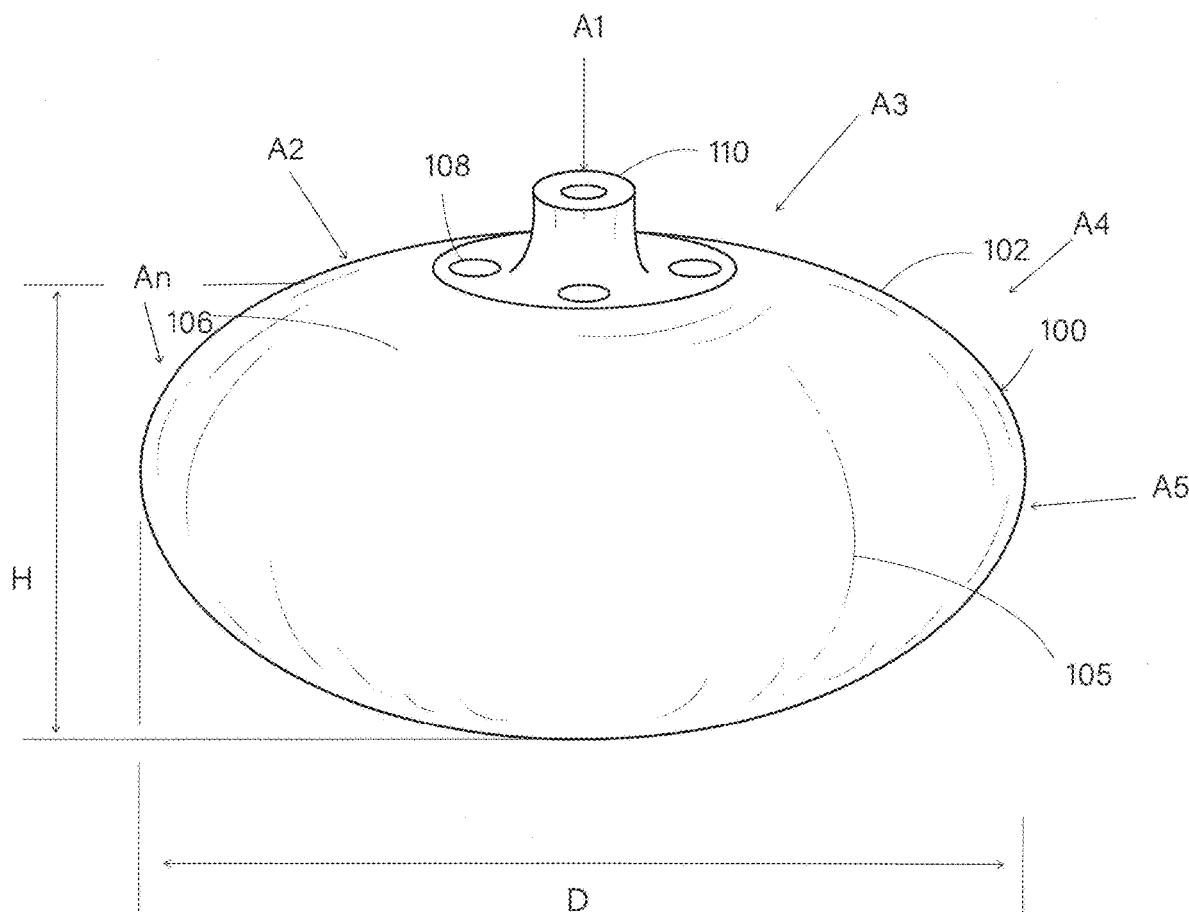
FIG. 8 is a perspective view of a vibration isolator member and direction arrows.

In particular examples as shown in FIG. 8, the hollow body 102 has a generally rounded, disc shape with protruding central hubs 110 and 111. The disc-shaped hollow body 102 may have a generally flat upper side with an upward protruding central hub 110, a generally flat lower side with a downward protruding central hub 111, and a generally rounded peripheral side. The generally round disc-shaped hollow body 102 has an outer diameter D (corresponding to the greatest or maximum diameter portion of the hollow body 102), and a height dimension H (excluding the height hubs 110 and 111).

The generally round disc shape of the hollow body 102 defines a main axis $A_1$ along which the hubs 110 and 111 extend. The hollow, disc-shape of the body 102 can enhance the ability of the body 102 to flex or compress along multiple different directions (axes), and can reduce restrictions on the direction of flexibility of compression. For example, a disc-shaped body 102 may be configured to be flex or compress in any of the multiple directions shown in FIG. 8, where the arrows $A_1$-$A_N$ represent any number of multiple directions (or axes) along which the hollow body 102 may compress or flex. In particular examples, the axes $A_2$-$A_N$ are at any oblique angle, relative to the axis $A_1$. Accordingly, a force or shock directed along any of the multiple axes or directions $A_1$-$A_N$ can result in a compression or flexing of the hollow body 102 along that direction or axis. In examples having a generally round disc shape of the hollow body 102 the directions or axes $A_1$-$A_N$ along which the hollow body 102 may compress or flex can be around the entire circumference of the hollow body 102, allowing the hollow body 102 to compress and flex in response to shocks forces in many different directions.

In other embodiments, the hollow body 102 can have other suitable shapes, including, but not limited to a rectangular, toroidal, or triangular latitudinal cross-sectional shape, etc. The latitudinal cross-sectional shape of the body 102 can define a stiffness (e.g., radial, axial, etc.) of the deforming member 100 in one or more lateral directions. In some examples, a container 10 may include a plurality of flexible vibration isolator members 100 having a plurality of different shapes or configurations, at respectively different locations within the interior volume 12 of the container 10, to provide a plurality of support points of differing stiffness or flexibility.

The interior cavity 104 of the hollow body 102 defines an open interior volume, and the outer wall 106 has a defined wall thickness dimension. In particular examples, the hollow body 102 has no internal structural or walls, within the outer wall 106. The open interior cavity 104 (with no internal walls or obstructions) can enhance the ability of the hollow body 102 to compress or flex in any of multiple different directions, without obstruction. However, in other examples, the hollow body 102 may have a toroidal or other configuration that includes an internal wall surrounded by the outer wall 106.

The stiffness or flexibility of the hollow body 102 may be defined, in part, by the material and structure (shape and wall structure) of the hollow body 102, by the ratio of the diameter D and height H, and by the wall thickness and interior volume of the hollow body 102. In particular examples, the hollow body 102 is configured to have a selected or desired stiffness and flexibility in one or more defined directions, for example, by selecting one or more (or any suitable combination) of the material and shape of the hollow body 102, the thickness of the wall 106, the ratio of the diameter D and height H, or other parameters. In certain examples, the hollow body 102 is configured to have a desired or particular stiffness and flexibility in one or more, or multiple directions (to compress or flex along one or more, or any of the multiple axes or directions $A_1$-$A_N$ shown in FIG. 8, or other axes). Accordingly, a vibration, physical shock, acceleration, deceleration or other force directed along any of the multiple directions can result in a compression or flex of the hollow body 102 along that direction or axis, to dampen or inhibit transmission of the force to the deck.

In particular examples, the hubs 110 and 111 extend outwardly from the center or main axis $A_1$ of the body 102. In other examples, one or both of the hubs 110 and 111 may extend from an off-centered (or off-axis) location at the top or bottom of the vibration isolator member 100. In yet other examples, the vibration isolator member 100 may be configured without one or both of the hubs 110 and 111.

In certain examples, the downward extending hub 111 of the vibration isolator member 100 is configured to interface with (be received within) one or more of the interface regions 22 of the inside surface 26 of the bottom wall 14 of the container 10. Similarly, in certain examples, the upward extending hub 110 is configured to interface with (be received within) one or more of the apertures 58 of the deck 50.

In certain examples, one or both of the hubs 110 and 111 may have a shape or size (a latitudinal cross-sectional shape or size) that corresponds to a shape or size (a latitudinal cross-sectional shape or size) of a receptacle (formed by the interface aperture 58 in the deck 50, and by the opening or recess 28 in the protrusion 24 of the bottom wall 14. In certain examples, that latitudinal cross-sectional shape is a round or circular shape, such that the hub 110 and 111 may be received in the receptacle, in any rotational orientation (relative to the main axis $A_1$). In other examples, that latitudinal cross-sectional shape is non-circular and defines one or a plurality of specific rotational orientations at which the hub 110 or 111 may be received within the receptacle. In particular examples, the hubs 110 and 111 (and associated receptacles) have any suitable latitudinal cross-sectional shape including, but not limited to circular, oval, square, polygonal, complex shaped with curved and straight surfaces, or the like.

In certain examples, the latitudinal cross-sectional shape of the hub 110 (and of the interface aperture 58) is different from the cross-sectional shape of the hub 111 (and of the opening or recess 28), and the shapes are selected such that the hub 110 would fit into the interface aperture 58 but would not fit within the opening or recess 28. Alternatively, or in addition, the shapes of the hubs 110 and 111 are selected such that the hub 111 would fit into the interface opening or recess 28, but would not fit within the interface aperture 58. Such examples can help a user to assemble a container 110 correctly, with the vibration isolator member(s) 100 facing the proper direction and in a proper orientation.

In certain examples, the hollow body 102 includes one or more apertures 108 and 112 located adjacent or around one or both of the hubs 110 and 111. The apertures 108 and 112 may operate as fastening apertures or venting apertures (or both). Each aperture 108 and 112 extends through the outer wall 106. One or more (or each) of the apertures 108 and 112 may be threaded (or include a threaded flange nut 114 or other threaded nut) to receive a threaded shaft of a fastener 40 or 41, for threaded engagement with the fastener 40 or 41. The flange nut 114 can provide a threaded receptacle for the fastener 40 or 41 and can also reduce forces (e.g., shear, etc.) exerted on or by the fasteners to help protect the body 102 of the vibration isolator member 100. The apertures 112 are arranged to align with the fastener apertures 30 on the bottom wall 14 of the container 10, when the hub 111 is received within the interface opening or recess 28 in the bottom wall 14. Similarly, apertures 108 may be arranged to align with fastener apertures (not shown) on the deck 50, when the hub 110 is received within the interface aperture 58. In other examples, the apertures 108 (or the apertures 112) need not align with fastener apertures or receive fasteners 40.

Examples of a flange nut 114 are shown in FIGS. 9-12. The flange nut 114 includes a cylindrical section 115 surrounded by a flange 116. The cylindrical section 115 of the flange nut has a threaded interior and is open on one end 120 to receive a threaded shaft of a fattener 40 or 41, or the like. The flange 116 includes periphery projections 118 configured to extend into or through (e.g., pierce, penetrate, etc.) the wall 106 of the hollow body 102 to fixedly couple the flange nut 114 to the hollow body 102. In some examples, the flange projections 118 may have a sharp or pointed tip, to help penetrate the wall 106 of the hollow body 102.

Figure 9:
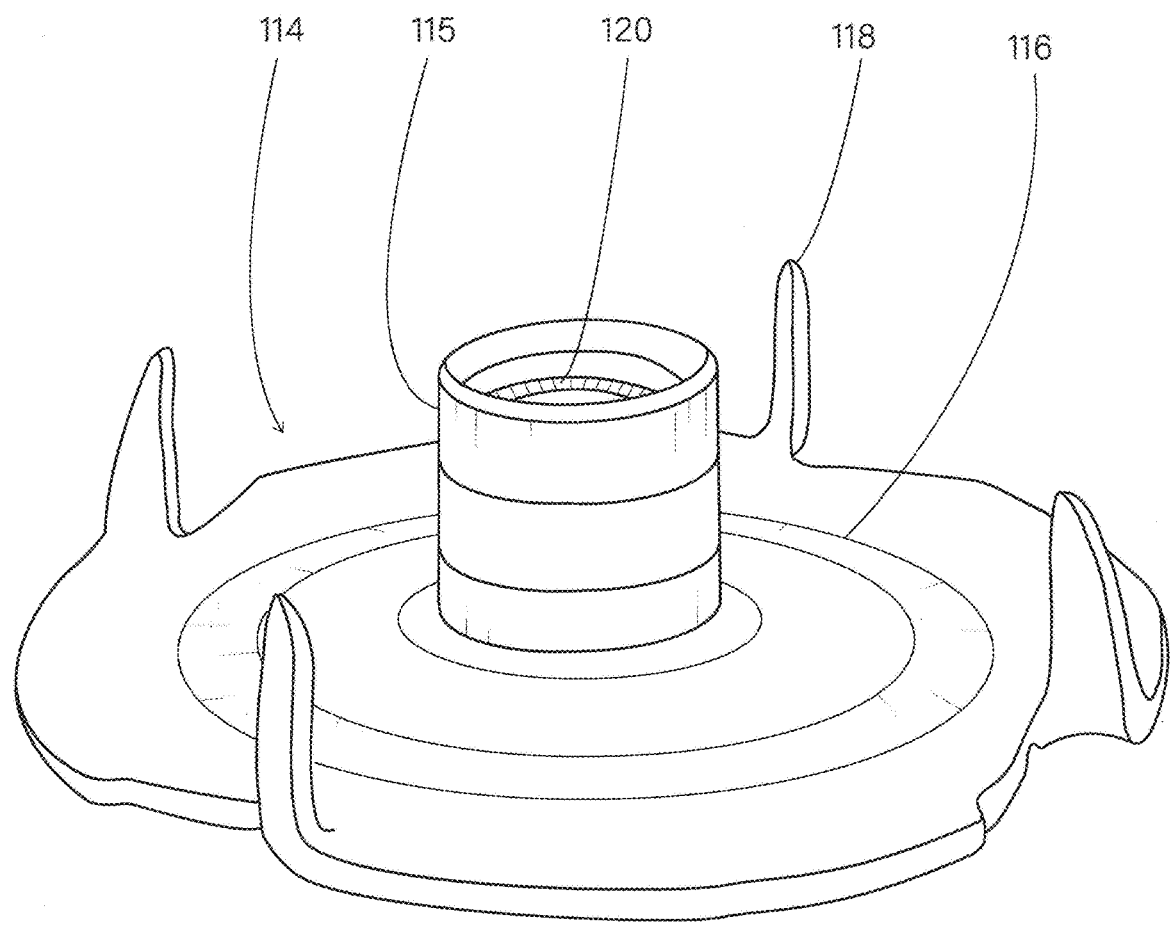
FIG. 9 is a perspective view of a flange nut for an exemplary embodiment.
Figure 10:
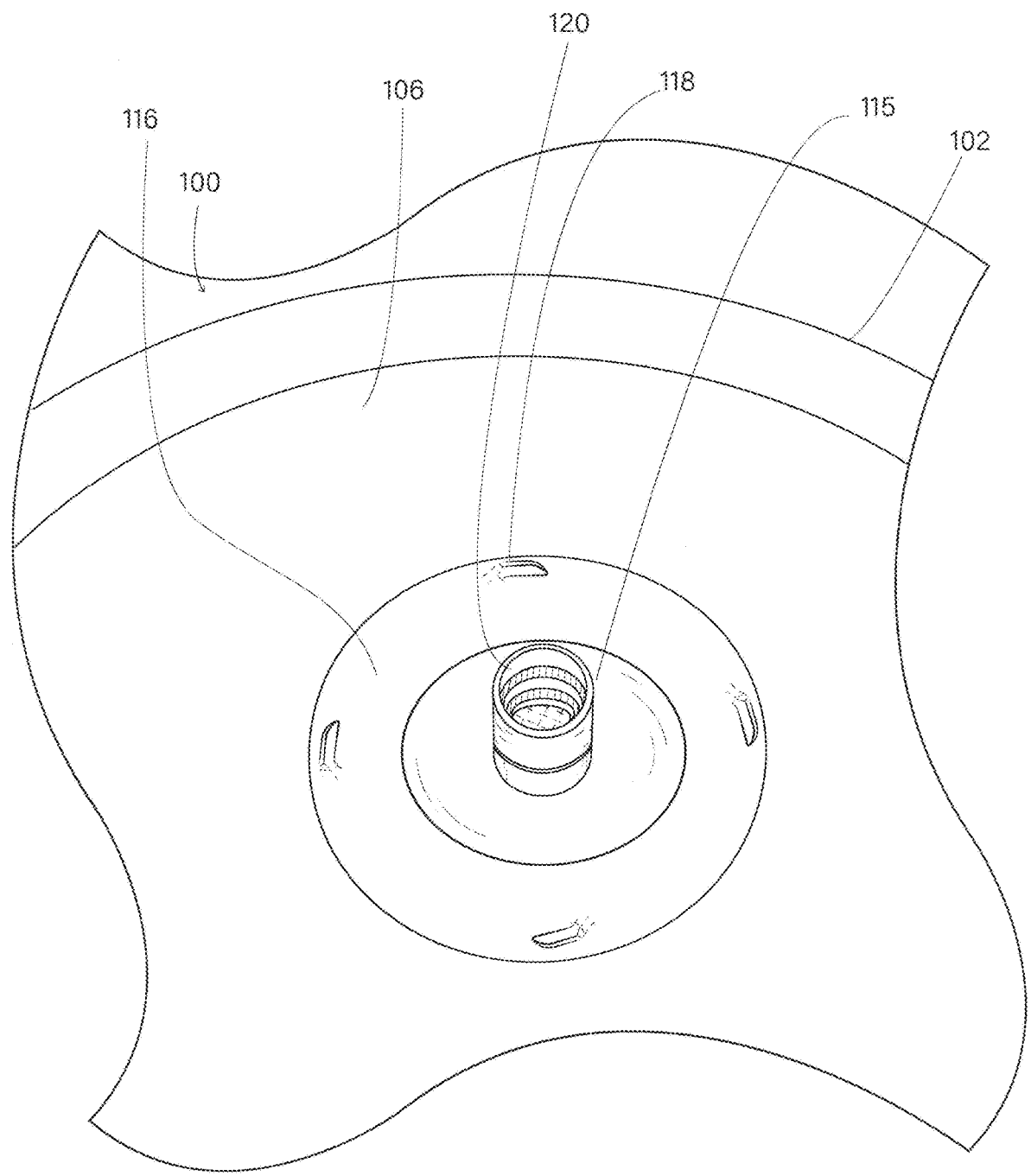
FIG. 10 is a perspective view of the flange nut of FIG. 9 on the vibration isolator member of FIG. 8.
Figure 11:
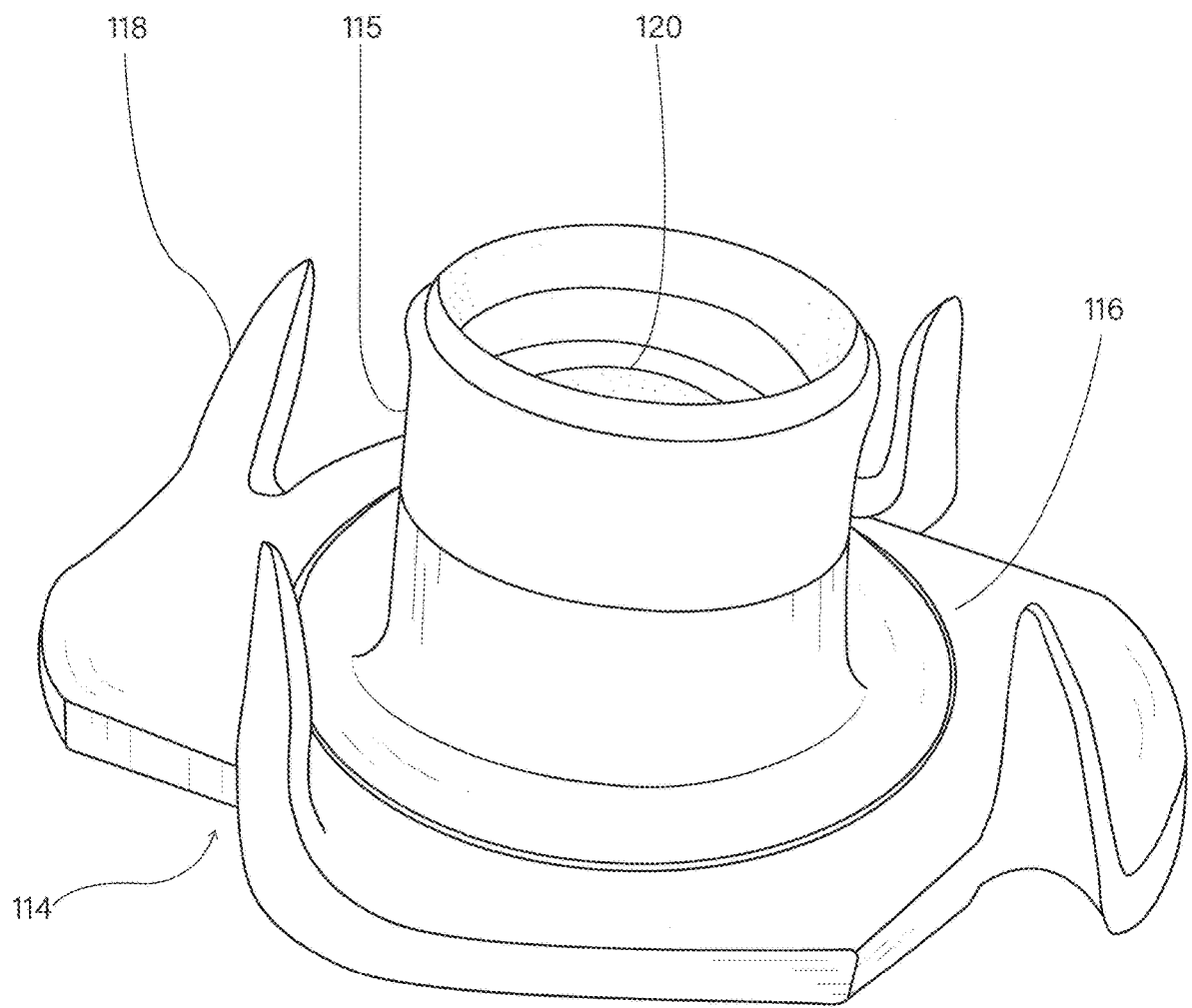
FIG. 11 is a perspective view of another flange nut for an exemplary embodiment.
Figure 12:
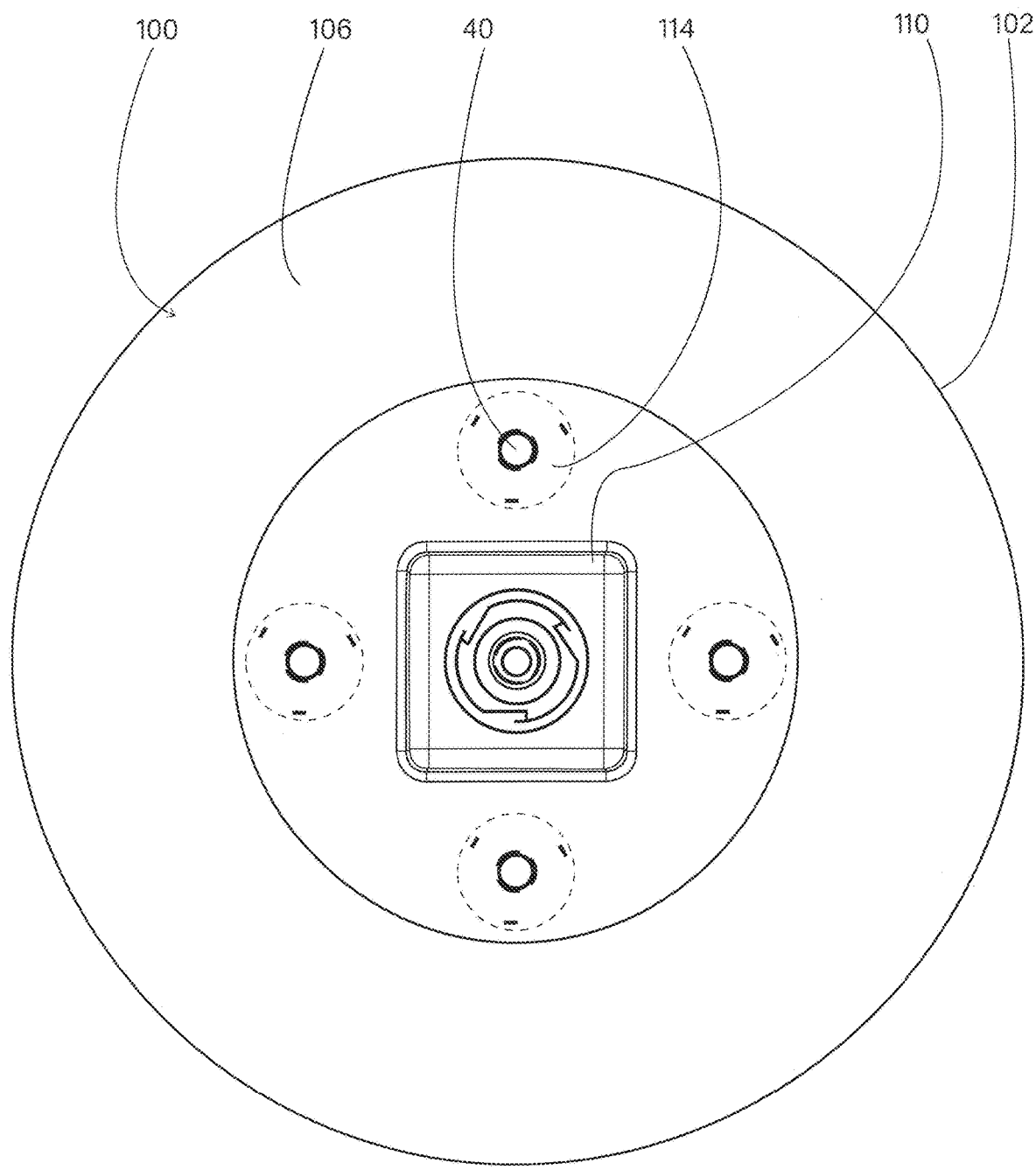
FIG. 12 is a perspective view of flange nuts of FIG. 9 and the flange nut of FIG. 11, on the vibration isolator member of FIG. 8.

The flange 116 of the flange nut 114 is configured to abut against and interface with the hollow body 102. The flange nut 114 example in FIGS. 9 and 10 is configured to abut against and interface with an interior surface of the hollow body 102. The flange nut 114 in FIGS. 11 and 12 is configured to abut against and interface with an exterior surface of the hollow body 102. In the example in FIGS. 9 and 10, the flange projections 118 extend in the same direction that the cylindrical portion 115 extends relative to the flange 116, to pierce an interior surface of the wall 106 of the hollow body 102 while the cylindrical portion 115 extends into or through the wall 106. In the example in FIGS. 11 and 12, the flange projections 118 extend in the opposite direction that the cylindrical portion 115 extends relative to the flange 116 to pierce an exterior surface of the wall 106 of the hollow body 102 while the cylindrical portion 115 extends into or through the wall 106. Alternatively, or in addition, the flange nut 114 can be couple to the wall 106 by adhesive, or other suitable coupling or fastener mechanisms.

The flange nut 114 has a flange 116 with a diameter that is larger than the diameter of the fastener aperture in the hub 110 or the hub 111, or the fastener apertures 108 and 112 on the hollow body 102. The cylindrical portion 115 of the flange nut 114 may extend into the fastener aperture, while the projections 118 of the flange nut 114 pierce the wall 106 of the hollow body 102. A flange nut 114 (according to either of the examples in FIGS. 9 and 11, or other suitable examples) may be secured to the hollow body 102 at a position on the hub 110 or the hub 111, or adjacent to any of the apertures 108 and 112, to receive and connect with a threaded fastener 40 or 41, as described herein.

Figure 13:
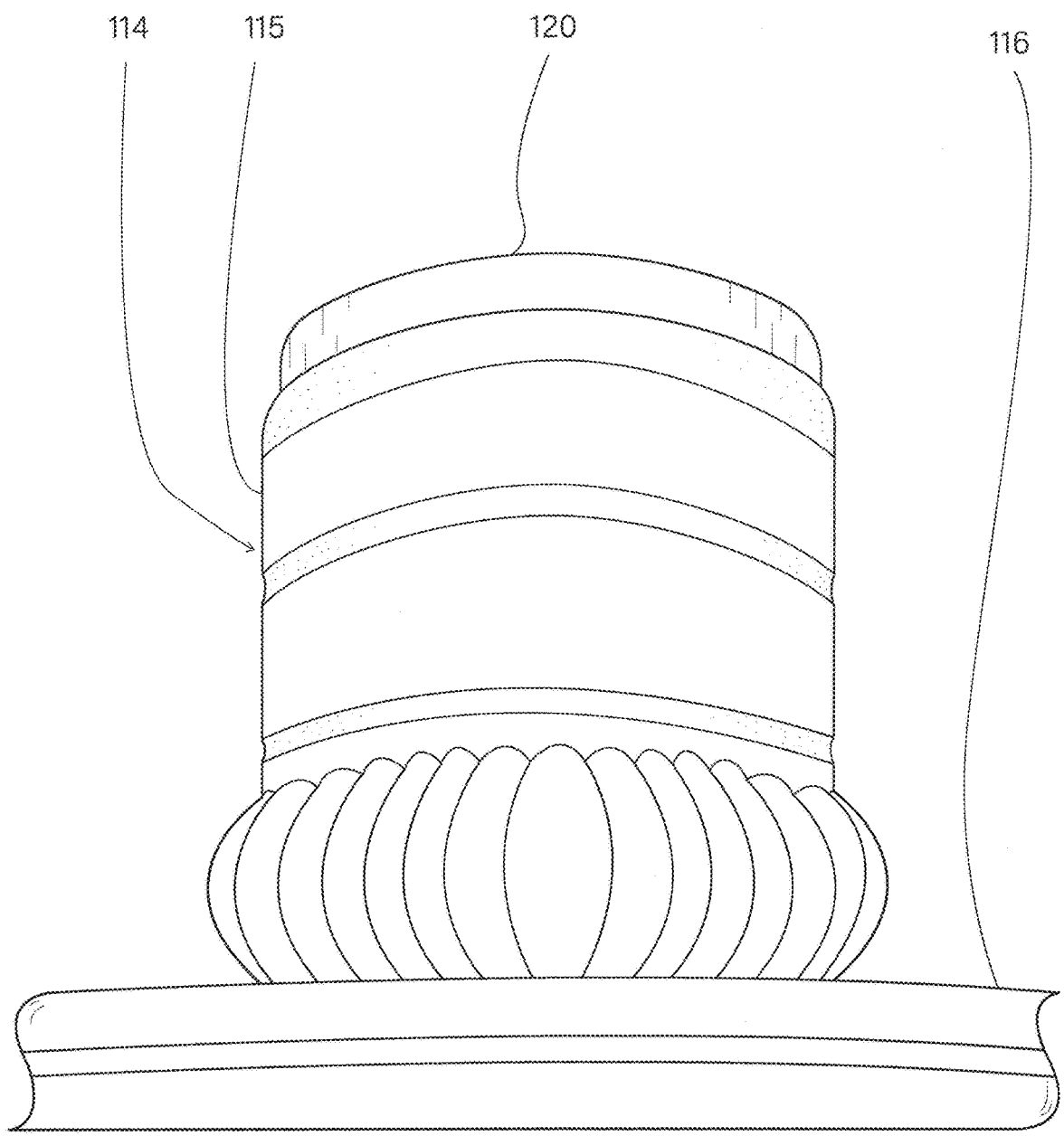
FIG. 13 is a side view of a rivet nut for an exemplary embodiment.
Figure 14:
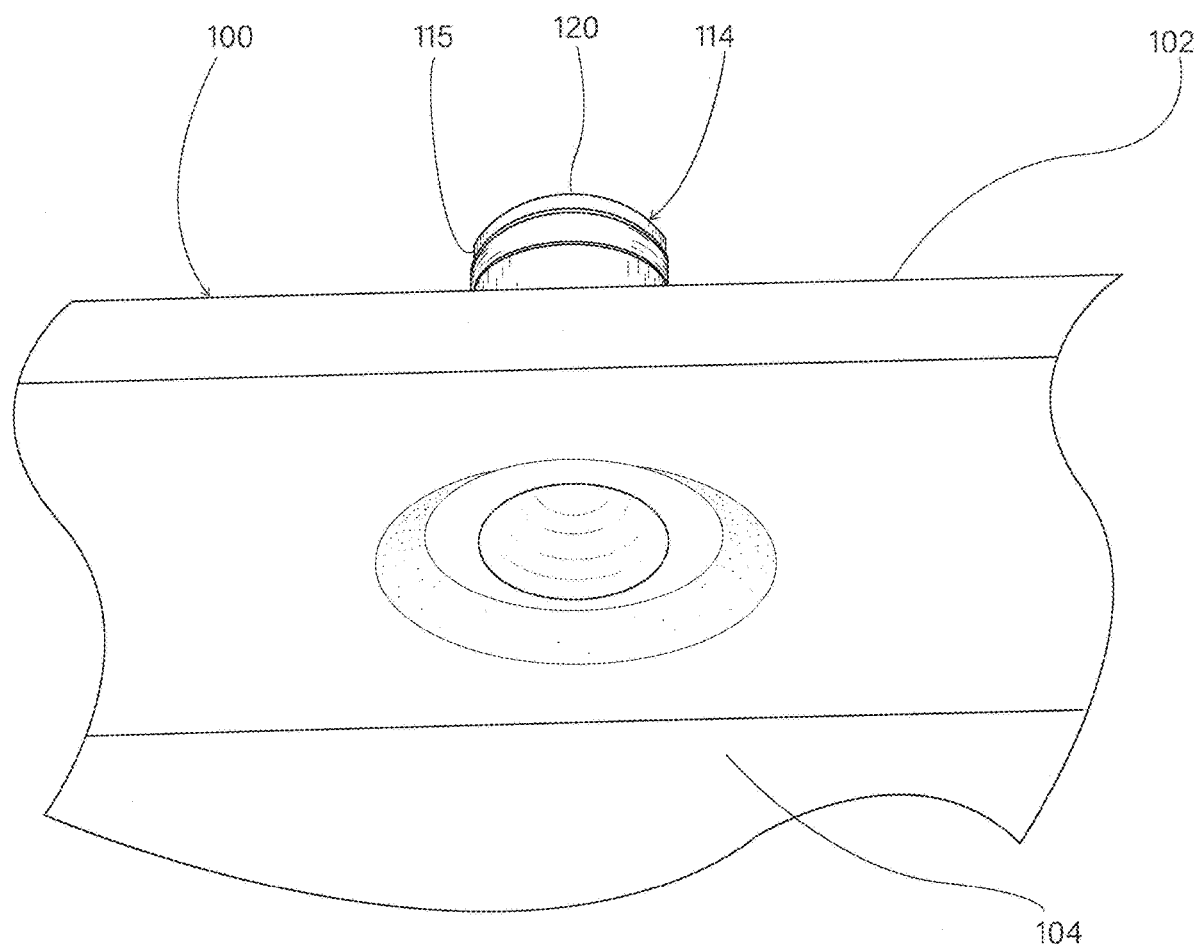
FIG. 14 is a perspective view of the rivet nut of FIG. 13 on the vibration isolator member of FIG. 8.

A flange nut 114 according to another example is shown in FIGS. 13 and 14 and includes a rivet-like structure that can be installed on the hollow body 102, from a location outside of the hollow body 102. In certain examples, the flange nut 114 may include a rivet nut or a slotted rivet nut. In certain non-limiting examples, the flange nut 114 may include a slotted rivet nut such as, but not limited to the Bollhoff Plusnut® by Rivet Nut USA (a division of Cardinal Components, Inc.), or other suitable slotted rivet nut. In certain non-limiting examples, the flange nut 114 may include another rivet nut such as, but not limited to the Bollhoff Rivnut®, the Bollhoff Hexnut® or the Bollhoff Rivkle® by Rivet Nut USA (a division of Cardinal Components, Inc.). In certain non-limiting examples, the flange nuts 114 may include, but are not limited to any nuts having an expandable barrel (of which the Bollhoff Rivnut is an example) or spreadable arms (of which the Bolhoff Plusnut is an example), to form a flange on one or both sides of the wall 106 of the hollow body. In other examples, the flange nut 114 may include other suitable rivet nuts or fasteners.

The flange nut 114 in FIGS. 13 and 14 includes a cylindrical portion 115 having a threaded interior and open end 120 as discussed herein. The flange nut 114 in FIGS. 13 and 14 has a flange 116 that does not include projections 118, but, instead, is enlarged or flared outward on both surfaces (inner and outer surfaces) of the wall 106 of the hollow body 102, to secure the flange nut 114 to the hollow body 102.

In some embodiments, each vibration isolator member 100 is fixedly coupled to the deck 50 and/or the bottom wall inner surface 26 of the container 10 via fasteners 40 and 41 that secure to flange nuts or other threaded fastener structure, as described herein. In other examples, one or more (or each) vibration isolator member 100 is fixedly coupled to the deck 50 and/or the bottom wall inner surface 26 of the container 10 via an adhesive. In other embodiments, one or more (or each) vibration isolator member 100 can include an enhanced friction surfaces (such as, but not limited to a contoured surface, a rubber surface, or the like) to in addition to or in place of one or more (or both) of the hubs 110 and 111 and fasteners 40 and 41, to inhibit movement of the vibration isolator member(s) 100 relative to the bottom wall 14 or the deck 50 (or both).

In one example of assembling a container 10, an outer shell is formed or obtained, to have an interior volume 12 of sufficient size and strength to receive and contain a particular cargo (or general cargo). In addition, a deck 50 is formed or obtained, to have sufficient size and strength to support the cargo. One or more vibration isolator members 100 are selected (for example, based on stiffness, flexibility, strength or other characteristics) and mounted to the deck 50, in a desired arrangement.

In certain examples, each vibration isolator member 100 may be mounted to the to the inner surface of the bottom wall 14 of the container 10, before the vibration isolator member(s) 100 are mounted to the deck 50. In particular, a downward extending hub 111 of each vibration isolator member 100 is aligned with and inserted in a respective one of the openings or recesses 28 in the protrusion 24 of the interface region 22. Fasteners 40 are inserted through the fastener apertures 30 and rotationally coupled to the flange nut 114 in the apertures 112 of the vibration isolator member 100, to couple the vibration isolator members 100 to the bottom wall 14 of the outer shell 11. In other examples, the vibration isolator member(s) 100 may be mounted to the deck 50 (as described below), and thereafter, the deck and already attached vibration isolator member(s) 100 may be inserted into the interior volume 12 of the shell 11, and the vibration isolator member(s) 100 may be mounted to the bottom wall 14 of the shell 11 as described above.

To mount each vibration isolator member 100 to the deck 50, the deck 50 is inserted into the interior volume 12 of the outer shell 11, and the upward extending hub 110 of the vibration isolator member 100 is inserted in and received by the interface aperture 58 in the deck 50. A spacer 64 is or has been disposed within the second region 62 of the interface aperture 58. A fastener 41 is inserted through the interface aperture 58 and rotationally coupled to a flange nut 114 or threaded aperture in the upward extending hub 110 of the vibration isolator member 100.

Cargo may be placed on the surface 52 of the deck 50. Cargo retaining mechanisms may be used to secure the cargo to the deck 50. A lid or cover 18 may be secured over the side walls 16 to close the interior volume 12. Thereafter, the closed container 10 may be transported, stored or engaged in other activities. In the course of such activities, the container 10 may encounter physical shocks, including vibrations, bumps, drops, accelerations, decelerations, or the like.

The vibration isolator member(s) 100 are configured to deform in response to a force, vibration or other physical shock applied to the container 10, to dampen the transmission of the force, vibration or other shock to the deck 50. The deformation of the vibration isolator member(s) 100 causes air to vent to and from the interior cavity 104, to facilitate contraction and expansion, in reaction to changing forces or loads applied to the vibration isolator member(s) 100.

In particular examples, venting apertures in the hollow body 102 (e.g., apertures 108, 112 or other venting apertures) are configured to facilitate airflow between the environment outside of the hollow body 102, and the inner volume of the hollow body 102, which can increase or decrease the stiffness of the vibration isolator member 100 by controlling the speed of expansion or contraction of the vibration isolator member 100. One or more venting apertures can be configured to delay airflow into the interior cavity 104, to reduce fluctuations of the stiffness of the vibration isolator member 100. Also, one or more venting apertures can be configured to more rapidly allow airflow out of the inner cavity than airflow into the interior cavity 104, to also reduce fluctuations of the stiffness of the vibration isolator member 100. In some embodiments, each of the venting apertures includes a valve, functioning as an interface between the interior cavity 104 and the environment outside of the hollow body 102, where the valves can be configured to restrict/prevent airflow or control air flow into or out of the interior cavity 104. In some embodiments, the valves and vent apertures are configured such that, when a load is placed on the vibration isolator member 100, air flows from the interior cavity 104 to the environment outside of the hollow body 102 at a first flow rate, but when the load is removed, air flows into the interior cavity 104 from the environment outside of the hollow body 102, at a second flow rate that is different from the first flow rate. In some examples, the first flow rate is larger than the second flow rate, facilitating quicker contraction than expansion of the vibration isolator member 100.

In some examples, the body 102 of the vibration isolator member 100 can include one or more radial slits or cuts 105. The radial slits or cuts 105 can be located around a periphery of the body 102, and can be configured to lower a radial stiffness of the deforming member 100. The lowered radial stiffness can enhance the ability of the body 102 to move radially (e.g., twisting, etc.) when a load is applied.

Figure 15:
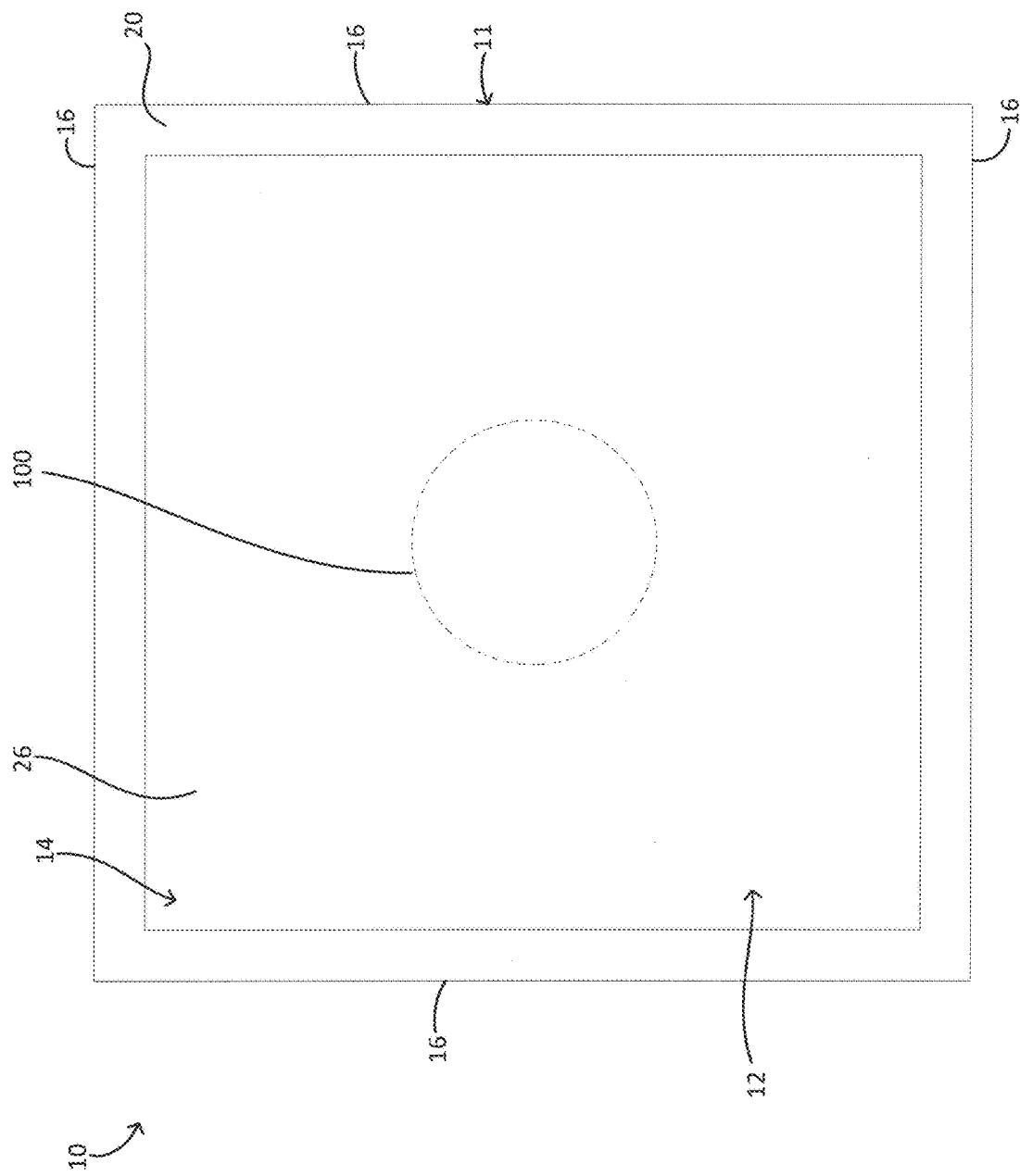
FIG. 15 is a schematic diagram of a first arrangement of a plurality of deforming members according to one embodiment.
Figure 16:
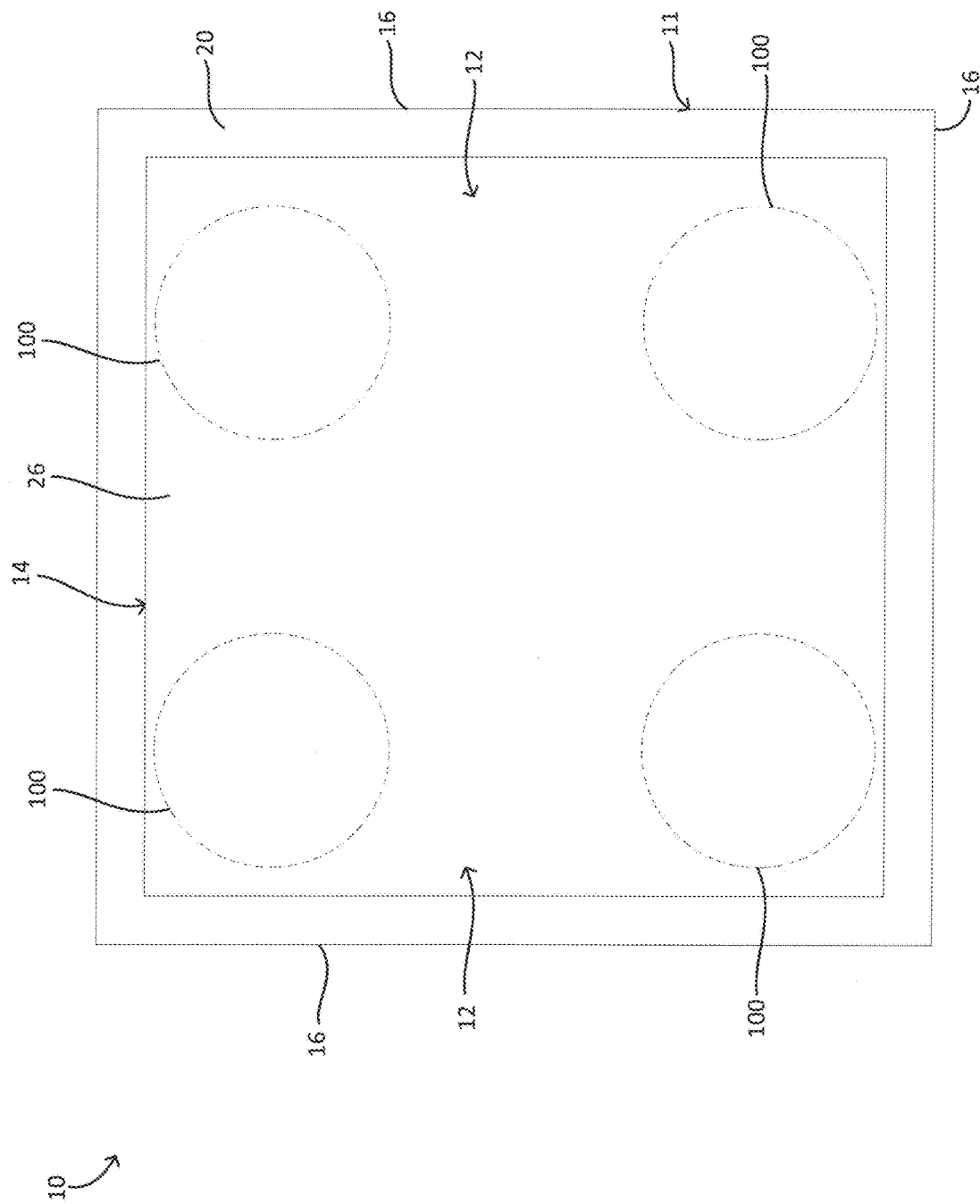
FIG. 16 is a schematic diagram of a second arrangement of a plurality of deforming members according to one embodiment.
Figure 17:
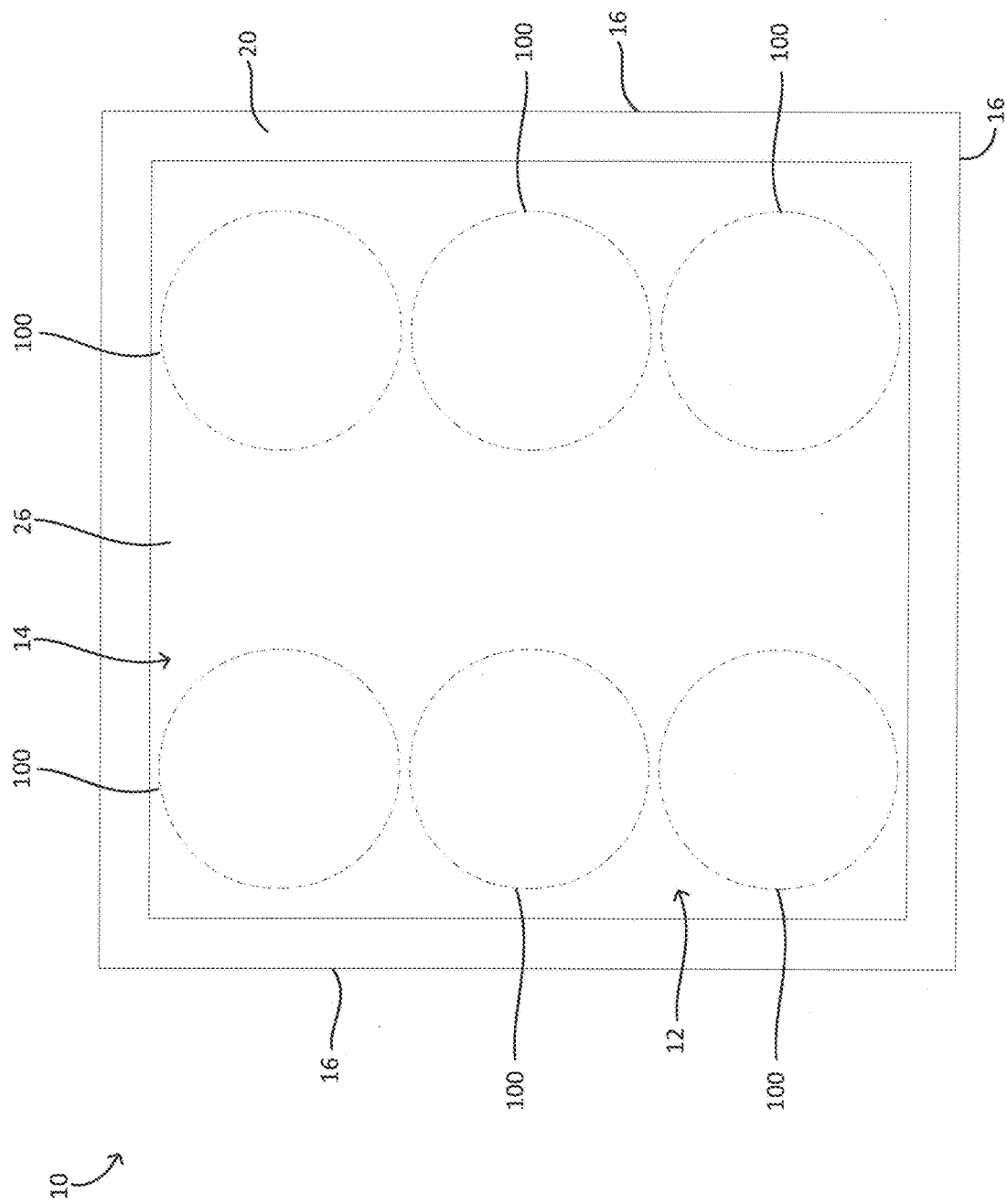
FIG. 17 is a schematic diagram of a third arrangement of a plurality of deforming members according to one embodiment.
Figure 18:
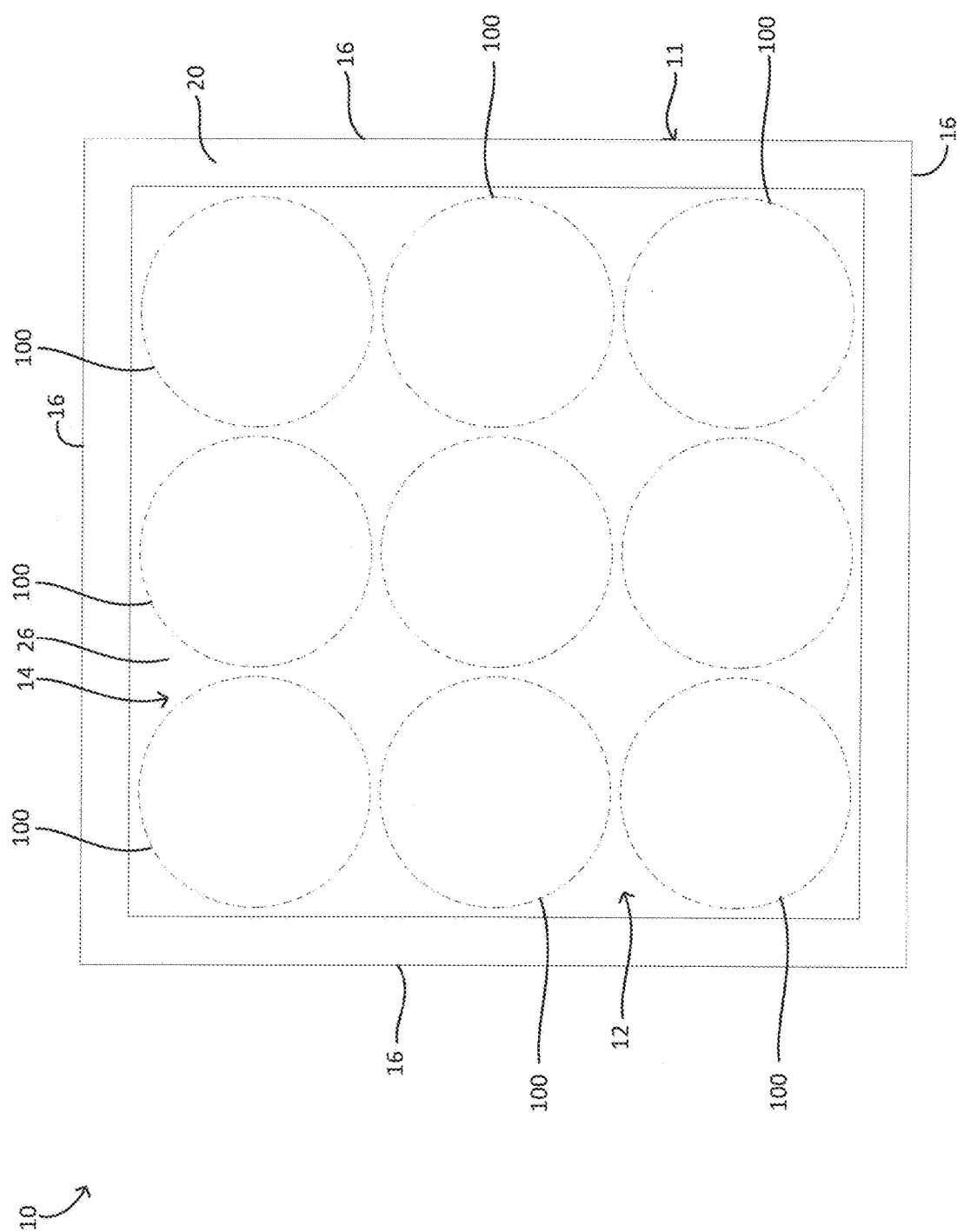
FIG. 18 is a schematic diagram of a fourth arrangement of a plurality of deforming members according to one embodiment.
Figure 19:
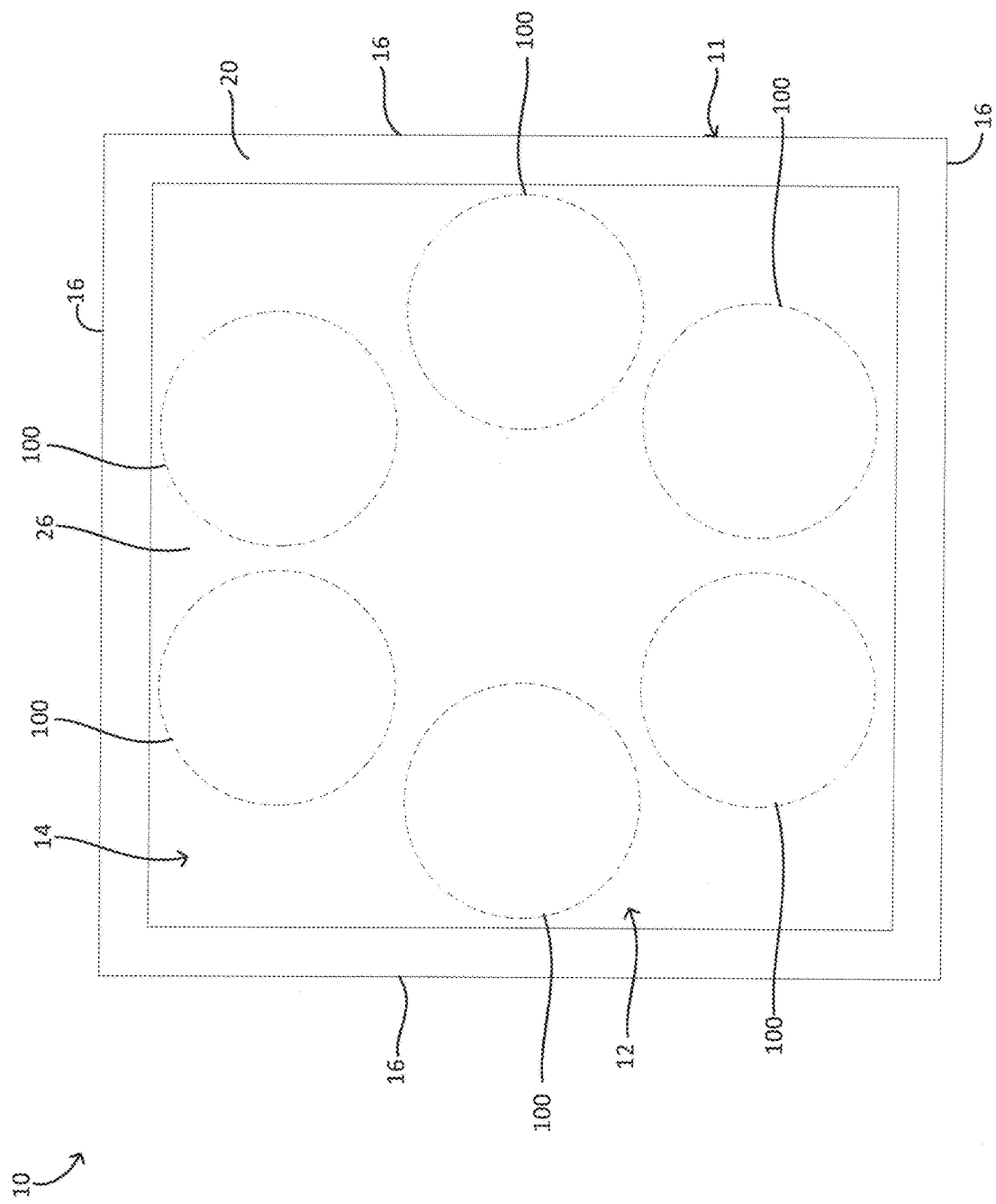
FIG. 19 is a schematic diagram of a fifth arrangement of a plurality of deforming members according to one embodiment.

As described herein, the number and location of vibration isolator member(s) 100 may be selected for providing a desired or maximum support capability, vibration isolation and stability. Referring to FIGS. 15-20, various arrangements of one or more vibration isolator members 100 are shown. However, other embodiments include other suitable arrangements. The arrangements can include any suitable number of the vibration isolator members 100. In one embodiment, a single vibration isolator member 100 is positioned on the bottom wall inner surface 26 of the container 10 (e.g., as shown in FIG. 15). In another embodiment, four vibration isolator members 100 are positioned in four respective corners on the bottom wall inner surface 26 of the container 10 (e.g., as shown in FIG. 16). In yet another embodiment, the vibration isolator members 100 are arranged in a grid pattern (e.g., having multiple rows and/or columns, as shown in FIGS. 17 and 18). In yet a further embodiment, the deforming members 100 can be positioned in a circular arrangement or concentric circular arrangement on the bottom wall inner surface 26 of the container 10 (e.g., as shown in FIGS. 19 and 20).

In examples described herein, one or more vibration isolator members 100 may be coupled to the bottom wall 14 of the outer shell 11 of the container 10. However, in other examples, one or more vibration isolator members 100 may be coupled to a side wall 16 or a lid or cover 18 of the container 10, instead of or in addition to the bottom wall 14. In some embodiments, one or more vibration isolator members 100 is coupled (at the upward extending hub 110) to a deck 50, or to a bottom outer surface of a container 10, and is configured to be coupled (at the downward extending hub 111) to an anchor surface (such as, but not limited to a surface of a truck-trailer, a floor of a building, a deck of a train car, a deck of a ship, or the like).

In some examples, a container system includes one or more container outer shells 11 and decks 50, and a plurality of hollow bodies 102 including different hollow bodies of different colors, where one or more hollow bodies 102 may be selected (based, at least in part, on the color of the hollow bodies) to assemble with one (or each) of the shells 11 and one of the decks 50, to form a container 10 for a desired context of use. In such examples, each color (for the hollow bodies 102) may represent a particular range of values for a characteristic. For example, a first color may represent a first range of weight values (e.g., up to X pounds), a second color may represent a second range of weight values (e.g., above X pounds up to Y pounds), and a third color may present a third range of weight values (e.g., above Y pounds up to Z pounds), where X, Y and Z represent numerical values corresponding to the amount of weight that the vibration isolator member is rated to hold (and where X is greater than Y, and Y is greater than Z). In other examples, the system of hollow bodies may include hollow bodies of other colors to represent other ranges (e.g., two different ranges, or more than 3 different ranges), or may have colors that represent other ranges of characteristics. In other examples, the hollow bodies 102 may have other suitable markings (as an alternative to color or in addition to color) to represent different characteristics (or range values of a characteristic), where such markings may include but are not limited to numerical or textual messages, patterns, designs or other visually discernable features. With such colored or otherwise marked hollow bodies, a user may select one or more (or a plurality) of hollow bodies 102 having a first color (representing a first weight range or other characteristic suitable for a desired context of use), mount the selected hollow bodies 102 to the bottom wall 14 of a shell 11 and to a deck 50, to form a container 10 for the desired context of use.

CONFIGURATION OF EXEMPLARY EMBODIMENTS

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the container as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the fastener apertures 30 described in FIGS. 5 and 6, may be incorporated in the recess 28 described in the FIGS. 5 and 6. Where one example of an element from one embodiment that can be incorporated or utilized in another embodiment described above, it should be appreciated that various features of different embodiments may be incorporated or utilized together with any of the other embodiments disclosed herein.

What is claimed is:

1. A shock or vibration isolator system comprising:
   at least one deck for holding cargo;
   at least one vibration isolator member coupled to the deck, for supporting the deck and to reduce or dampen a transfer of shock or vibration to the deck, each vibration isolator member comprising:
      a flexible body having an outer wall and an inner cavity, the outer wall comprising a flat lower surface, the flexible body configured to resiliently compress in response to a force;
      an upward protruding first hub received within an aperture defined in the deck; and
      a downward protruding second hub coupled with the lower surface and configured to attach to a bottom wall of a container shell, wherein the second hub has a different lateral cross-section shape or size relative to the first hub;
   wherein the first hub and the second hub each have a lateral cross-section width that is less than a lateral cross-section width of the flexible body;
   wherein the outer wall includes one or more apertures to allow fluid flow into and out of the inner cavity of the flexible body during compression or expansion of the flexible body;
   wherein the lower surface defines a plurality of fastener openings located radially outward of the second hub for receiving fasteners to fasten the vibration isolator member to the bottom wall of the container shell.

2. The system of claim 1, wherein each vibration isolator member further comprises at least one fastener opening for receiving at least one fastener in or around the first hub to fasten the vibration isolator member to the deck.

3. The system of claim 1, wherein the flexible body of each vibration isolator member comprises a hollow body made of resilient plastic material that selectively compresses into a compressed state in response to the force applied to the vibration isolator member, and returns to a pre-compressed state when the force is removed.

4. The system of claim 3, wherein the hollow body is empty and free to flex and compress along a plurality of different axial directions.

5. The system of claim 3, wherein the hollow body has a round, disc shape defining an outer diameter D dimension and a height H dimension, and wherein the hollow body is flexible to compress along a main axis of the round, disc shape, and along any axis of a plurality of further axes that are at an oblique angle relative to the main axis, in response to receiving a force along one of the main or further axis.

6. The system of claim 1, wherein the at least one vibration isolator member comprises a plurality of vibration isolator members coupled to the deck to support the deck and reduce or dampen a transfer of shock or vibration to the deck.

7. The system of claim 1, wherein the at least one vibration isolator member comprises a plurality of vibration isolator members, and wherein the deck includes at least one aperture for receiving at least a portion of the upward protruding hub of each of the plurality of vibration isolator members.

8. The system of claim 1, wherein the first hub and the second hub are integrally formed with the flexible body of the at least one vibration isolator member.

9. A container system comprising:
an outer shell defining an internal volume, the outer shell having a bottom wall; and
a shock or vibration isolator system as recited in claim 1;
wherein the deck is disposed within the internal volume of the outer shell and configured to support cargo; and
wherein the at least one vibration isolator member is disposed within the internal volume of the outer shell, to support the deck within the outer shell.

10. The container system of claim 9, wherein each vibration isolator member further comprises at least one attachment interface configured to facilitate placement or mounting of the vibration isolator member in a position relative to at least one of the deck and the bottom wall.

11. The container system of claim 9, wherein the flexible body of each vibration isolator member comprises a hollow body made of resilient plastic material that selectively compresses into a compressed state in response to the force applied to the vibration isolator member, and returns to a pre-compressed state when the force is removed.

12. The container system of claim 11, wherein the hollow body is empty and free to flex and compress along a plurality of different axial directions.

13. The container system of claim 11, wherein the hollow body has a round, disc shape defining an outer diameter D dimension and a height H dimension, and wherein the hollow body is flexible to compress along a main axis of the round, disc shape, and along any axis of a plurality of further axes that are at an oblique angle relative to the main axis, in response to receiving a force along one of the main or further axis.

14. The container system of claim 9, wherein the bottom wall includes at least one interface region, each interface region having a mounting surface on which a vibration isolator member is mounted, each mounting surface having an annular or partially annular shape that extends around or partially around an opening or recess, the opening or recess for receiving the second hub of a vibration isolator member.

15. The container system of claim 9, wherein the bottom wall includes at least one interface region, each interface region having a protrusion portion that protrudes above a surface of the bottom wall, the protrusion having an upper mounting surface for supporting one of the vibration isolator members, and an opening or recess for receiving the second hub of a vibration isolator member.

16. The container system of claim 15, wherein the protrusion of each interface region forms a reverse shaped depression on an outer surface of the bottom wall, for receiving at least one protruding feature on another container, when the outer shell is stacked onto that other container.

17. The container system of claim 9, wherein the at least one vibration isolator member comprises a plurality of vibration isolator members disposed within the internal volume of the outer shell, to support the deck within the outer shell and reduce or dampen a transfer of shock or vibration to the deck.

* * * * *